United States Patent
Ghodrati et al.

(10) Patent No.: US 12,307,249 B2
(45) Date of Patent: May 20, 2025

(54) BIT-PARALLEL VECTOR COMPOSABILITY FOR NEURAL ACCELERATION

(71) Applicant: The Regents of the University of California, Oakland, CA (US)

(72) Inventors: Soroush Ghodrati, La Jolla, CA (US); Hadi Esmaeilzadeh, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 18 days.

(21) Appl. No.: 18/004,802

(22) PCT Filed: Jul. 9, 2021

(86) PCT No.: PCT/US2021/041167
§ 371 (c)(1),
(2) Date: Jan. 9, 2023

(87) PCT Pub. No.: WO2022/011308
PCT Pub. Date: Jan. 13, 2022

(65) Prior Publication Data
US 2023/0244484 A1    Aug. 3, 2023

Related U.S. Application Data

(60) Provisional application No. 63/049,982, filed on Jul. 9, 2020.

(51) Int. Cl.
*G06F 9/30* (2018.01)
*G06F 9/38* (2018.01)

(52) U.S. Cl.
CPC ...... *G06F 9/30036* (2013.01); *G06F 9/30018* (2013.01); *G06F 9/30032* (2013.01); *G06F 9/3822* (2013.01); *G06F 9/3877* (2013.01)

(58) Field of Classification Search
CPC .................. G06F 9/30032; G06F 9/30036
See application file for complete search history.

(56) References Cited

U.S. PATENT DOCUMENTS

| | | | |
|---|---|---|---|
| 2001/0023425 A1 | 9/2001 | Oberman et al. | |
| 2005/0219422 A1* | 10/2005 | Dorojevets ......... | G06F 9/30112 712/E9.046 |
| 2013/0124590 A1 | 5/2013 | Gunnam et al. | |

(Continued)

OTHER PUBLICATIONS

Ghodrati et al., "Bit-Parallel Vector Composability for Neural Acceleration," https://arxiv.org/abs/2004.05333, submitted Apr. 11, 2020, 6 pages.

(Continued)

*Primary Examiner* — Michael J Metzger
(74) *Attorney, Agent, or Firm* — Perkins Coie LLP

(57) ABSTRACT

Methods, apparatus and systems that relate to hardware accelerators of artificial neural network (ANN) performance that significantly reduce the energy and area costs associated with performing vector dot-product operations in the ANN training and inference tasks. Specifically, the methods, apparatus and systems reduce the cost of bit-level flexibility stemming from aggregation logic by amortizing related costs across vector elements and reducing complexity of the cooperating narrower bitwidth units.

20 Claims, 17 Drawing Sheets

(56) References Cited

U.S. PATENT DOCUMENTS

| | | | | |
|---|---|---|---|---|
| 2014/0207838 | A1* | 7/2014 | Danne | G06F 9/3001 |
| | | | | 708/235 |
| 2019/0026249 | A1* | 1/2019 | Talpes | G06N 3/048 |
| 2019/0042252 | A1* | 2/2019 | Kaul | G06F 9/30036 |
| 2020/0081711 | A1* | 3/2020 | Bayat | G11C 11/54 |
| 2020/0104131 | A1* | 4/2020 | Liguori | G06F 9/30036 |
| 2021/0049463 | A1* | 2/2021 | Ruff | G06N 3/045 |

OTHER PUBLICATIONS

International Search Report and Written Opinion for International Application No. PCT/US21/41167, mailed Oct. 20, 2021, 15 pages.

Albericio, J , "Cnvlutin: Ineffectual-Neuron-Free Deep Neural Network Computing", 2016 ACM/IEEE 43rd Annual International Symposium on Computer Architecture, in ISCA, 2016, 6 pages.

Chen, Y , "DaDianNao: A Machine-Learning Supercomputer", 2014 47th Annual IEEE/ACM International Symposium on Microarchitecture, in MICRO, 2014, 14 pages.

Chen, Y , "Eyeriss: A Spatial Architecture for Energy-Efficient Dataflow for Convolutional Neural Networks", 2016 ACM/IEEE 43rd Annual International Symposium on Computer Architecture, in ISCA 2016, 13 pages.

Chi, P , "PRIME: A Novel Processing-in-memory Architecture for Neural Network Computation in ReRAM-based Main Memory", 2016 ACM/IEEE 43rd Annual International Symposium on Computer Architecture, in ISCA, 2016, 13 pages.

Choi, J , "PACT: Parameterized Clipping Activation for Quantized Neural Networks", arXiv preprint arXiv:1805.06085, 2018, 15 pages.

Delmas Lascorz, A , "Bit-Tactical: A Software/Hardware Approach to Exploiting Value and Bit Sparsity in Neural Networks", Session: Machine Learning I ASPLOS'19, Apr. 13-17, 2019, Providence, RI, USA, in Proceedings of the Twenty-Fourth International Conference on Architectural Support for Programming Languages and Operating Systems, pp. 749-763, ACM, 2019, 15 pages.

Fowers, J , "A Configurable Cloud-Scale DNN Processor for Real-Time AI", in Proceedings of the 45th Annual International Symposium on Computer Architecture, pp. 1-14, IEEE Press, 2018, 14 pages.

Gao, M , "TETRIS: Scalable and Efficient Neural Network Acceleration with 3D Memory", in ASPLOS, 2017, 14 pages.

H.M. C. Consortium , "Hybridmemory cube specification 2.1", Hybrid Memory Cube—HMC-30G-VSR PHY HMC Memory Features, Last Revision Jan. 2013., 132 pages.

Han, S , "EIE: Efficient Inference Engine on Compressed Deep Neural Network", 2016 ACM/IEEE 43rd Annual International Symposium on Computer Architecture, in ISCA 2016, 12 pages.

Hubara, I , "Quantized Neural Networks: Training Neural Networks with Low Precision Weights and Activations", Journal of Machine Learning Research 18 (2018) 1-30 Submitted Sep. 2016; Revised Apr. 2017; Published Apr. 2018, arXiv, 2016, 30 pages.

Jouppi, N , "In-Datacenter Performance Analysis of a Tensor Processing Unit", in ISCA, 2017, 12 pages.

Judd, P , "Stripes: Bit-Serial Deep Neural Network Computing", Authorized licensed use limited to: Univ of Calif San Diego. Downloaded on Oct. 21, 2024 at 19:16:24 UTC from IEEE Xplore. Restrictions apply, in MICRO 2016, 12 pages.

Lee, J , "unpu: a 50.6TOPS/W Unified Deep Neural Network Accelerator with 1b-to-16b Fully-Variable Weight Bit-Precision", ISSCC 2018 / SESSION 13 / Machine Learning and Signal Processing / 13.3, in ISSCC, 2018, 3 pages.

Li, S , "CACTI-P: Architecture-Level Modeling for SRAM-based Structures with Advanced Leakage Reduction Techniques", in ICCAD, 2011, 8 pages.

Mishra, A , "WRPN: wide reduced-precision networks", arXiv, 2017, 11 pages.

Parashar, A , "SCNN: An Accelerator for Compressed-sparse Convolutional Neural Networks", in ISCA, 2017, 14 pages.

Reagen, B , "Minerva: Enabling Low-Power, Highly-Accurate Deep Neural Network Accelerators", 2016 ACM/IEEE 43rd Annual International Symposium on Computer Architecture, in ISCA, 2016, 12 pages.

Shafiee, A , "ISAAC: A Convolutional Neural Network Accelerator with In-Situ Analog Arithmetic in Crossbars", 2016 ACM/IEEE 43rd Annual International Symposium on Computer Architecture, in ISCA, 2016, 13 pages.

Sharify, S , "Laconic Deep Learning Inference Acceleration", in Proceedings of the 46th International Symposium on Computer Architecture, ACM, 2019, pp. 304-317.

Sharify, S , "Loom: Exploiting Weight and Activation Precisions to Accelerate Convolutional Neural Networks", arXiv, 2017, 6 pages.

Sharma, H , "Bit Fusion: Bit-Level Dynamically Composable Architecture for Accelerating Deep Neural Networks", 2018 ACM/IEEE 45th Annual International Symposium on Computer Architecture, 2018, 12 pages.

Zhang, S , "Cambricon-X: An Accelerator for Sparse Neural Networks", Authorized licensed use limited to: Univ of Calif San Diego. Downloaded on Oct. 21, 2024 at 19:12:55 UTC from IEEE Xplore. Restrictions apply, in MICRO 2016, 12 pages.

Zhou, S , "DOREFA-NET: Training Low Bitwidth Convolutional Neural Networks With Low Bitwidth Gradients", arXiv, 2016, 13 pages.

* cited by examiner

BIT-PARALLEL VECTOR COMPOSABILITY FOR NEURAL ACCELERATION

RELATED APPLICATIONS

This patent document is a U.S.C. § 371 National Stage application of International Application No. PCT/US2021/041167 titled "BIT-PARALLEL VECTOR COMPOSABILITY FOR NEURAL ACCELERATION" and filed on Jul. 9, 2021, which claims priority to and the benefits of the U.S. Provisional Patent Application No. 63/049,982, titled "BIT-PARALLEL VECTOR COMPOSABILITY FOR NEURAL ACCELERATION"and filed on Jul. 9, 2020. The entire contents of the above noted applications are incorporated by reference as part of the disclosure of this document.

STATEMENT REGARDING FEDERALLY SPONSORED RESEARCH OR DEVELOPMENT

This invention was made with the U.S. government support under CNS-1703812 and ECCS-1609823 awarded by the National Science Foundation. The U.S. government has certain rights in the invention.

TECHNICAL FIELD

This patent document relates to accelerator architectures applicable to neural networks.

BACKGROUND

Deep Neural Networks (DNNs) are revolutionizing a wide range of services and applications such as language translation, transportation, intelligent search, e-commerce, and medical diagnosis. These benefits are predicated upon delivery on performance and energy efficiency from hardware platforms.

SUMMARY OF CERTAIN EMBODIMENTS

The techniques disclosed herein can be implemented in various embodiments to implement hardware accelerators of artificial neural network (ANN) performance that significantly reduce the energy and area costs associated with performing vector dot-product operations in the ANN training and inference tasks.

One aspect of the disclosed embodiments relates to an apparatus for performing an energy-efficient dot-product operation between two input vectors that includes a plurality of vector computation engines, wherein each vector computation engine from the plurality of vector computation engines comprises an array of multipliers connected through one or more add units and configured to generate an output of the vector computation engine based on a dot-product operation on a subset of bits of the two input vectors. The apparatus further includes a plurality of shifters configured to shift the outputs of the vector computation engines. The apparatus also includes an aggregator coupled to the plurality of shifters and configured to generate a scalar output for the energy-efficient dot-product operation based on aggregating the shifted outputs.

Another aspect of the disclosed embodiments relates to an apparatus for performing an energy-efficient dot-product operation between a first vector and a second vector that includes a first group of multipliers and add units, wherein the first group of multipliers and add units is configured to produce a first dot-product of a third vector and a fourth vector, wherein each element of the third vector includes a subset of bits of a corresponding element of the first vector and each element of the fourth vector includes a subset of bits of a corresponding element of the second vector. The apparatus further includes a second group of multipliers and add units, wherein the second group of multipliers and add units is configured to produce a second dot-product of a fifth vector and a sixth vector, wherein each element of the fifth vector includes a subset of bits of a corresponding element of the first vector and each element of the sixth vector includes a subset of bits of a corresponding element of the second vector. The apparatus also includes a first bit shifter configured to bit-shift the first dot-product by a first number of bits and a second bit shifter configured to bit-shift the second dot-product by a second number of bits. The apparatus further includes an aggregator configured to aggregate the bit-shifted first dot-product and the bit-shifted second dot-product. Furthermore, the apparatus is configured to generate at least one of the first dot-product or the bit-shifted first dot-product in parallel with at least one of the second dot-product or the bit-shifted second dot-product.

Yet another aspect of the disclosed embodiments relates to a method of performing an energy-efficient dot-product operation between two vectors that includes generating partial dot-product outputs, wherein each partial dot-product output is based on performing a dot-product operation on a subset of bits of the two vectors using an array of multipliers connected through one or more add units. The method also includes shifting the partial dot-product outputs using bit shifters. The method further includes aggregating the shifted partial dot-product outputs using an aggregator to produce a scalar output for the energy-efficient dot-product operation. Furthermore, in the method, the generating partial dot-product outputs is performed in a parallel manner.

An aspect of the disclosed embodiments relates to a method of performing an energy-efficient dot-multiplication of a first vector and a second vector that includes calculating, using a first group of multipliers and add units, a first dot-product between a third vector and a fourth vector, wherein each element of the third vector includes a subset of bits of a corresponding element of the first vector and each element of the fourth vector includes a subset of bits of a corresponding element of the second vector. The method further includes calculating, using a second group of multipliers and add units, a second dot-product between a fifth vector and a sixth vector, wherein each element of the fifth vector includes a subset of bits of a corresponding element of the first vector and each element of the sixth vector includes a subset of bits of a corresponding element of the second vector. The method also includes bit-shifting the first dot-product by a first number of bits using a first bit shifter. The method includes bit-shifting the second dot-product by a second number of bits using a second bit shifter. The method also includes aggregating the bit-shifted first dot-product and the bit-shifted second dot-product using an aggregator. Furthermore, in the method, at least one of the calculating the first dot-product or bit-shifting the first dot-product is performed in parallel with at least one of the calculating the second dot-product or bit-shifting the second dot-product.

Another aspect of the disclosed embodiments relates to a method of performing an energy-efficient dot-multiplication operation on a first vector and a second vector, wherein each vector component of the first vector has a first number of bits and each vector component of the second vector has a second number of bits, that includes splitting bits of each component of the first vector into groups of bits such that the first vector is equal to a first linear combination of one or more vectors, wherein each component of each vector in the first linear combination includes a group of bits of a corresponding component of the first vector and has a third number of bits which is equal to or less than the first number of bits. The method also includes splitting bits of each component of the second vector into groups of bits such that the second vector is equal to a second linear combination of one or more vectors, wherein each component of each vector in the second linear combination includes a group of bits of a corresponding component of the second vector and has a fourth number of bits which is equal to or less than the second number of bits. The method further includes, for each vector in the first linear combination, calculating, using multipliers connected through add elements, a dot-product of the vector with each vector in the second linear combination and, for each dot-product of the vector with another vector from the second linear combination, shifting the dot-product using a bit shifting element. The method also includes aggregating the shifted dot-products to obtain a result of the dot-multiplication operation on the first vector and the second vector. Furthermore, in the method, at least some of the splitting, dot-product or shifting operations are performed at the same time.

DETAILED DESCRIPTION

Figure 1:
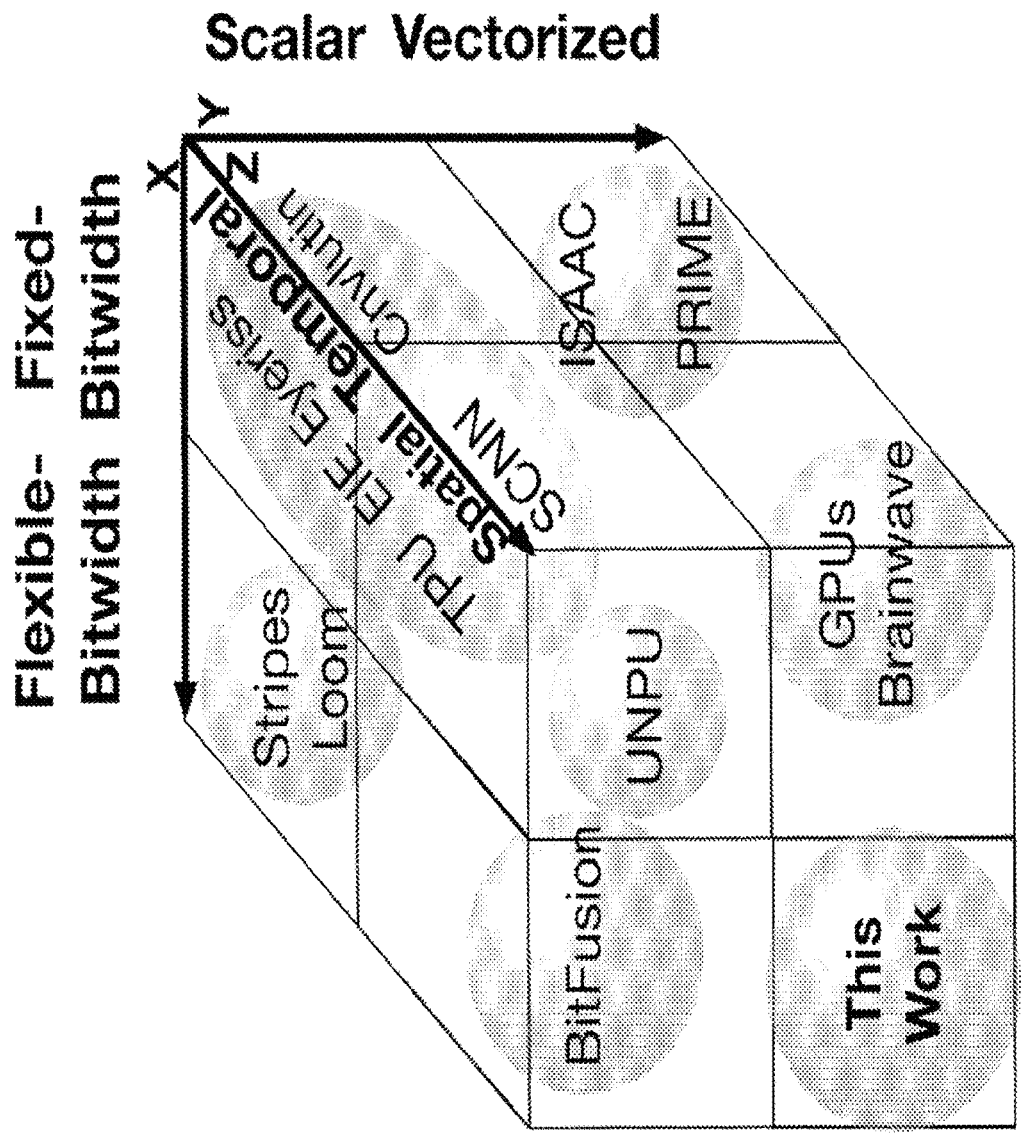
FIG. 1 illustrates a landscape of deep neural network (DNN) accelerators.

Deep learning is part of a family of machine learning methods based on artificial neural networks. A deep neural network (DNN) is an artificial neural network (ANN) with multiple layers between the input and output layers. DNNs are applicable to a wide range of services and applications such as language translation, transportation, intelligent search, e-commerce, and medical diagnosis. Performance and energy efficiency are key aspects to allow the applications to make the best use of DNNs. Currently, the need still exists to provide apparatus and methods that improve energy efficiency and performance of the neural network based inference tasks. The technology disclosed in this patent document addresses this need by providing an architecture for hardware accelerators of ANN performance that significantly reduces the energy and area (measured, e.g., in the number of logic gates and/or other elements per unit of the chip area) costs associated with performing vector dot-product operations that are ubiquitous in the ANN training and inference tasks. Specifically, the disclosed technology reduces the energy and area costs of bit-level flexibility stemming from aggregation logic that puts the results back together by amortizing these costs across vector elements (also referred to as vector components) and reducing complexity of the cooperating narrower bitwidth units. Methods, devices, and systems according to the technology disclosed in this patent document improve computer technology by improving energy and area efficiency of neural network performance accelerators.

Conventional neural accelerators rely on isolated self-sufficient functional units that perform an atomic operation while communicating the results through an operand delivery-aggregation logic. Each single unit processes all the bits of its operands atomically and produces all the bits of the results in isolation from other units. Technology disclosed in this patent document uses a different design style, where each unit is only responsible for a slice of the bit-level operations to interleave and combine the benefits of bit-level parallelism with the abundant data-level parallelism in deep neural networks. A dynamic collection of these units cooperate at runtime to generate bits of the results, collectively. Such cooperation requires extracting new grouping between the bits, which is only possible if the operands and operations are vectorizable. The abundance of Data-Level Parallelism and mostly repeated execution patterns provides a unique opportunity to define and leverage this new dimension of Bit-Parallel Vector Composability. This design intersperses bit parallelism within data-level parallelism and dynamically interweaves the two together. As such, the building block of neural accelerators according to the disclosed technology is a Composable Vector Unit that is a collection of Narrower-Bitwidth Vector Engines, which are dynamically composed or decomposed at the bit granularity. This patent document also describes examples of evaluation of example embodiments of the disclosed technology using six diverse convolutional neural networks (CNN) and long short-term memory (LSTM) deep networks across four design points: with and without algorithmic bitwidth heterogeneity and with and without availability of a high-bandwidth off-chip memory. Across these four design points, the disclosed Bit-Parallel Vector Composability technology brings 1.4 times to 3.5 times speedup and 1.1 times to 2.7 times energy reduction. Some example implementations of the disclosed technology are also comprehensively compared to the Nvidia's RTX 2080 TI GPU, which also supports INT-4 execution. The benefits range between 28.0 times and 33.7 times improvement in Performance-per-Watt.

The growing body of neural accelerators exploit various forms of Data-Level Parallelism (DLP) that are abundant in DNNs. Nonetheless, most techniques rely on isolated self-sufficient units that process all the bits of input operands and generate all the bits of the results. These values, packed as atomic words, are then communicated through an operand delivery-aggregation interconnect for further computation. This patent document discloses techniques that can be implemented as a different design where each unit in vectorized engines is responsible for processing a bit-slice. This design offers an opening to explore the interleaving of Bit-Level Parallelism with DLP for neural acceleration. Such an interleaving opens a new space where the complexity of Narrow-Bitwidth Functional Units needs to be balanced with respect to the overhead of bit-level aggregation as well as the width of vectorization. Additionally, the disclosed techniques create a new opportunity for exploring bit-flexibility in the context of vectorized execution.

As FIG. 1 illustrates, the landscape of neural accelerators can be depicted in the three dimensions of Type of Functional Units (Scalar vs. Vectorized), runtime Bit Flexibility (Fixed Bitwidth vs. Flexible Bitwidth), and Composability (Temporal vs. Spatial). The technology disclosed herein fills the vacancy for Vectorized Bit-Flexible Spatial Composability. The interleaving of the bit-level parallelism with DLP creates the new opportunity to explore bit-level composability where a group of bit-parallel vector units dynamically forms collaborative groups to carry out SIMD (single instruction, multiple data) operations. Recent inspiring research investigates bit-level composability for a scalar operation (a single multiplier—accumulator (MAC) unit) both in spatial and temporal mode. However, the space where composability (bit-level parallelism) meets vectorization (data-level parallelism) has not been thoroughly explored. Since the building block is a narrow bitwidth vector engine, another opportunity arises to support execution well below eight bits. That is leveraging the algorithmic insight that heterogenous assignment of bitwidths below eight to DNN layers can reduce their computational complexity while preserving accuracy. Fixed bitwidth designs cannot tap into this level of efficiency where each unit is only processing the fewest number of bits that can preserve the accuracy. Example implementations of the disclosed technology are evaluated with and without availability of algorithmic bitwidth heterogeneity. Experimentation with six real-world DNNs shows that bit-parallel vector composibility according to the disclosed technology provides 40% speedup and energy reduction compared to design with the same architecture (systolic) without support for the bit-parallel vector composibility according to the disclosed technology. When bit flexibility is applicable because of the heterogenous bitwidths in the DNN layers, the disclosed technology provides 50% speedup and 10% energy reduction compared to BitFusion, the state-of-the-art architecture that supports scalar bit-level composability in systolic designs.

When a high bandwidth off-chip memory is utilized, certain example embodiments enjoy 10% speedup and 30% energy reduction, respectively. Bit-parallel vector-composability according to the disclosed technology better utilizes the boosted bandwidth and provides 2.1 times speedup and 2.3 times energy reduction. With algorithmic bitwidth heterogeneity, some example embodiments provide 2.4 times speedup and 20% energy reduction, compared to BitFusion, while utilizing the same high bandwidth memory. Different permutations of the disclosed design style with respect to homogenous/heterogenous bitwidth and off-chip memory bandwidth are compared to the Nvidia's RTX 2080 TI GPU which also supports INT-4 execution. Benefits range between 28.0 times and 33.7 times higher Performance-per-Watt for four possible design points.

The fundamental property of vector dot-product operation—the most common operation in DNNs—is that vector dot-product with wide-bitwidth data types can be decomposed and reformulated as a summation of several dot-products with narrow-bitwidth data types. The element-wise multiplication in vector dot-product can be performed independently, exposing data level parallelism. The disclosed techniques explore another degree of parallelism—bit-level parallelism (BLP)—wherein individual multiplications can be broken down at bit-level and written as a summation of narrower bitwidth multiplications. The interleaving of both data-level parallelism in vector dot-product with bit-level parallelism in individual multiplications can be leveraged to introduce the notion of bit-parallel vector composability. This design style can be also exploited to support runtime-flexible bitwidths at the underlying hardware.

Digital values can be expressed as the summation of individual bits multiplied by powers of two. Hence, a vector dot-product operation between two vectors, $\vec{X}, \vec{W}$ can be expressed as follows:

$$\vec{X} \cdot \vec{W} = \Sigma_i(x_i \times w_i) = \Sigma_i((\Sigma_{j=0}^{bw_x-1} 2^j \times x_i[j]) \times (\Sigma_{k=0}^{bw_w-1} 2^k \times w_i[k])) \quad (1)$$

Variables $bw_x$ and $bw_w$ represent the bitwidths of the elements in $\vec{X}$ and $\vec{W}$, respectively. Expanding the bitwise multiplications between the elements of the two vectors yields:

$$\vec{X} \cdot \vec{W} = \Sigma_i(\Sigma_{j=0}^{bw_x-1} \Sigma_{k=0}^{bw_w-1} 2^{j+k} \times x_i[j] \times w_i[k]) \quad (2)$$

Conventional architectures rely on compute units that operate on all bits of individual operands and require complex left-shift operations followed by wide-bitwidth additions as shown in Equation 2. By leveraging the associativity property of the multiplication and addition, we can cluster the bit-wise operations that share the same significance position together and factor out the power of two multiplications. In other words, this clustering can be realized by swapping the order of $\Sigma_i$ and $\Sigma_j \Sigma_k$ operators.

$$\vec{X} \cdot \vec{W} = \Sigma_{j=0}^{bw_x-1} \Sigma_{k=0}^{bw_w-1} 2^{j+k} \times (\Sigma_i x_i[j] \times w_i[k]) \quad (3)$$

Leveraging this insight enables the use of significantly less complex, narrow-bitwidth, compute units (1-bit in the Equation 3), exploiting bit-level parallelism, amortizing the cost of left-shift and wide-bitwidth addition. Breaking down the dot-product is not limited to single bit and elements of the vectors can be bit-sliced with different sizes. As such, Equation 3 can be further generalized as:

$$\vec{X}\cdot\vec{W} = \qquad (4)$$

$$\sum_{j=0}^{\frac{bw_x}{\alpha}-1}\sum_{k=0}^{\frac{bw_w}{\beta}-1} 2^{\alpha j+\beta k} \times \left(\sum_i x_i[\alpha j:\ (\alpha+1)j]\times w_i[\beta k:\ (\beta+1)k]\right)$$

Figure 2A:
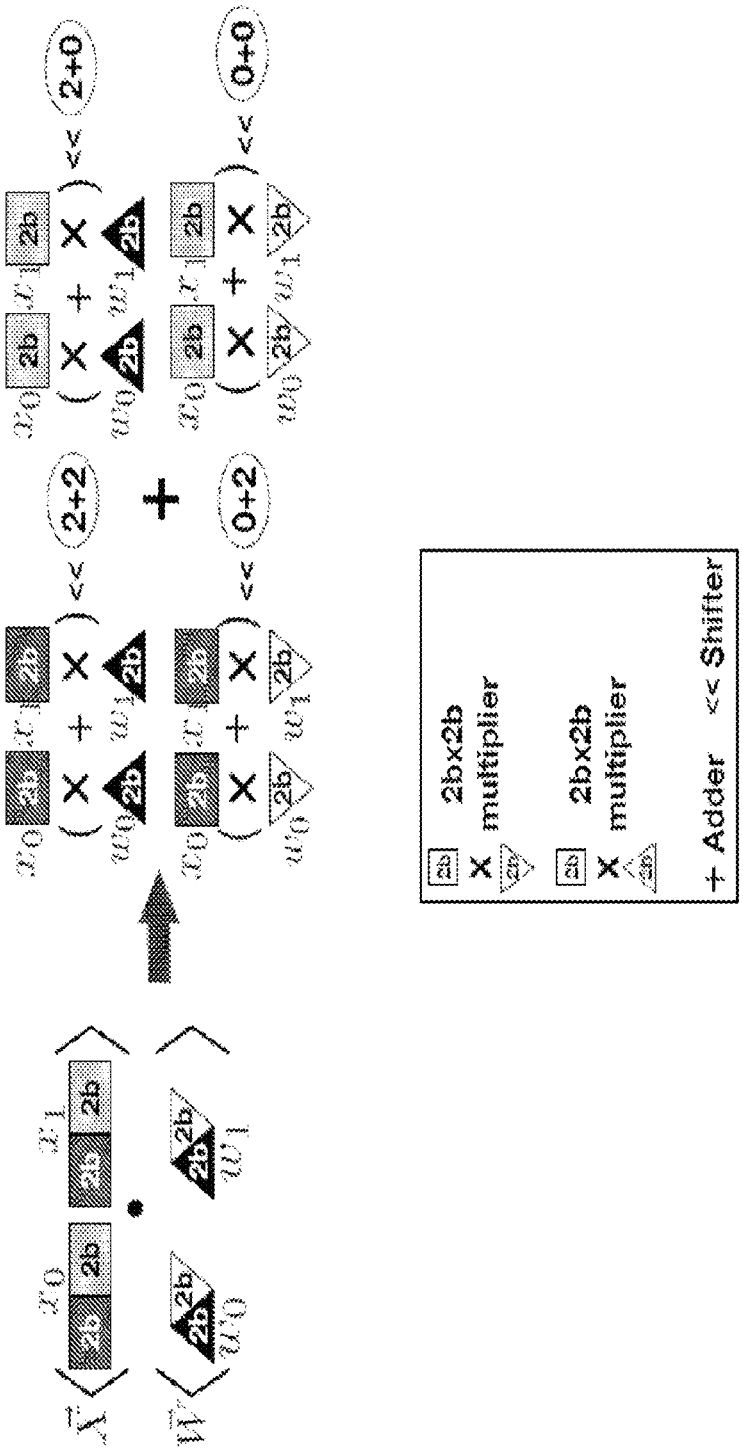
FIG. 2A illustrates an example implementation of fixed-bitwidth bit-parallel vector composability with 2-bit slicing according to the disclosed technology.

Here, $\alpha$ and $\beta$ are the bit-slices for operands $x_i$ and $w_i$ for the narrow-bitwidth compute units, respectively. FIG. 2A graphically illustrates bit-parallel vector composability using an example of a vector dot-product operation ($\vec{X}\cdot\vec{W}=\Sigma_i w_i \times w_i$) between two vectors of $\vec{X}$ and $\vec{W}$, each of which constitutes two 4-bit elements. As it is shown with different shades, each element can be bit-sliced and broken down into two 2-bit slices. With this bit-slicing scheme, the original element ($x_i$ or $w_i$) can be written as $2^2 \times bs/_{MSB} + 2^0 \times bs/_{LSB}$, where bsls are the bit-slices and they are multiplied by powers of two based on their significance position. With the aforementioned bit-slicing scheme, performing a product operation between an element from $\vec{X}$ and another from $\vec{W}$ requires four multiplications between the slices, each of which is also multiplied by the corresponding significance position factor. However, because of the associativity property of the multiply-add, we cluster the bit-sliced multiplications that share the same significance position and apply the power of two multiplicands by shifting the accumulated result of the bit-sliced multiplications.

Figure 2B:
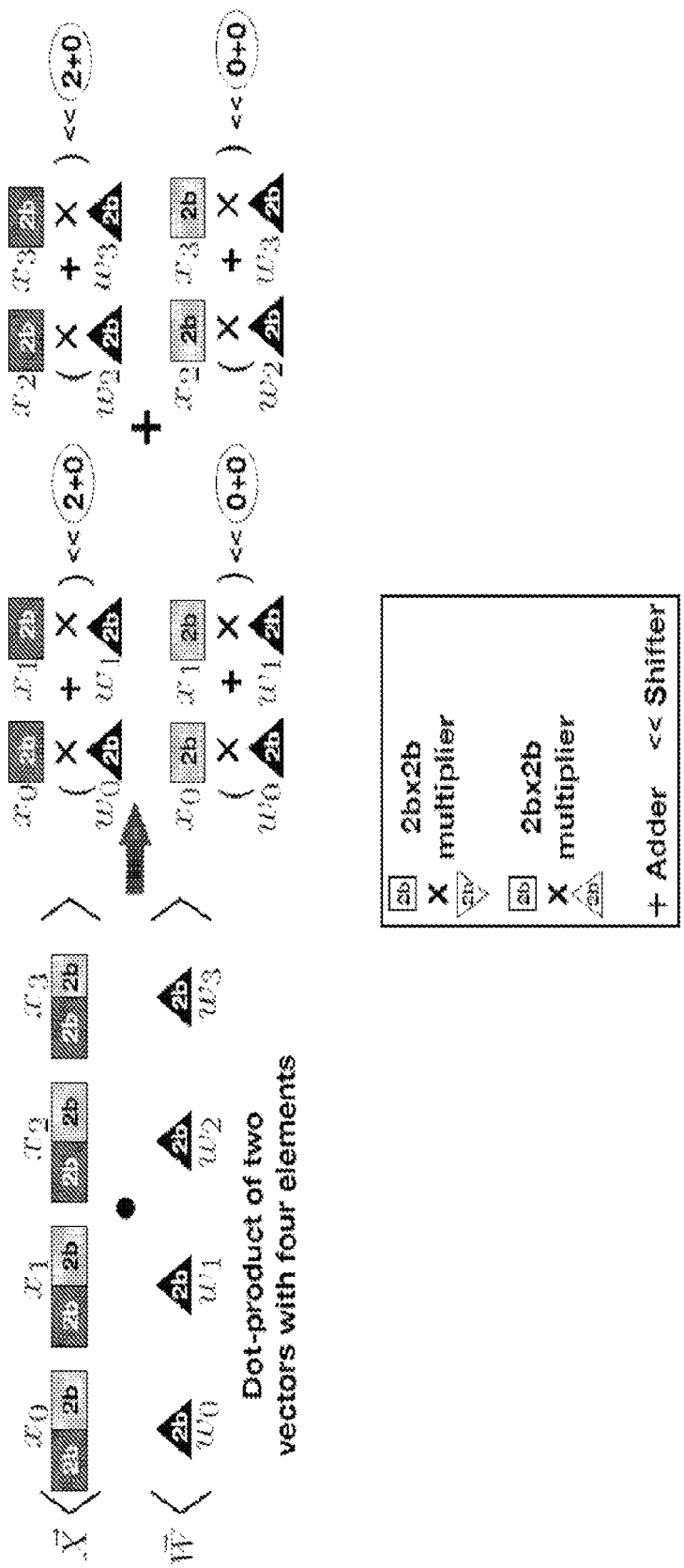
FIG. 2B illustrates an example implementation of bit-flexible bit-parallel vector composability for 4-bit inputs and 2-bit weights according to the disclosed technology.

The bit-parallel vector composable design style can enable flexible-bitwidth support at runtime. FIG. 2B shows an example of flexible-bitwidth vector dot-product operation considering the same number of compute resources (2-bit multipliers, adders, and shifters) as FIG. 2A. In FIG. 2B, a vector dot-product operation between a vector of inputs ($\vec{X}$) that has four 4-bit elements and a vector of weights ($\vec{W}$) that has four 2-bit elements is illustrated. Using the same bit-slicing scheme, the original vector $\vec{X}$ is broken down to two sub-vectors that are required to go under dot-product with $\vec{W}$ and then get shifted and aggregated. However, exploiting 2-bit datatypes for weights compared to 4-bit in the example given in FIG. 2A, provides 2 times boost in compute performance. Bit-parallel vector composability enables maximum utilization of the compute resources, resulting in computing a vector dot-product operation with 2 times more elements using the same amount of resources.

To enable hardware realization for the bit-parallel vector composability, the main building block of our design becomes a Composable Vector Unit (CVU), which performs the vector dot-product operation by splitting it into multiple narrow-bitwidth dot-products. As such, the CVU consists of several Narrow-Bitwidth Vector Engines (NBVE; also referred to as vector computation engine) that calculate the dot-product of bit-sliced sub-vectors from the original vectors. The CVU then combines the results from NBVEs according to the bitwidth of each DNN layer.

Figure 3A:
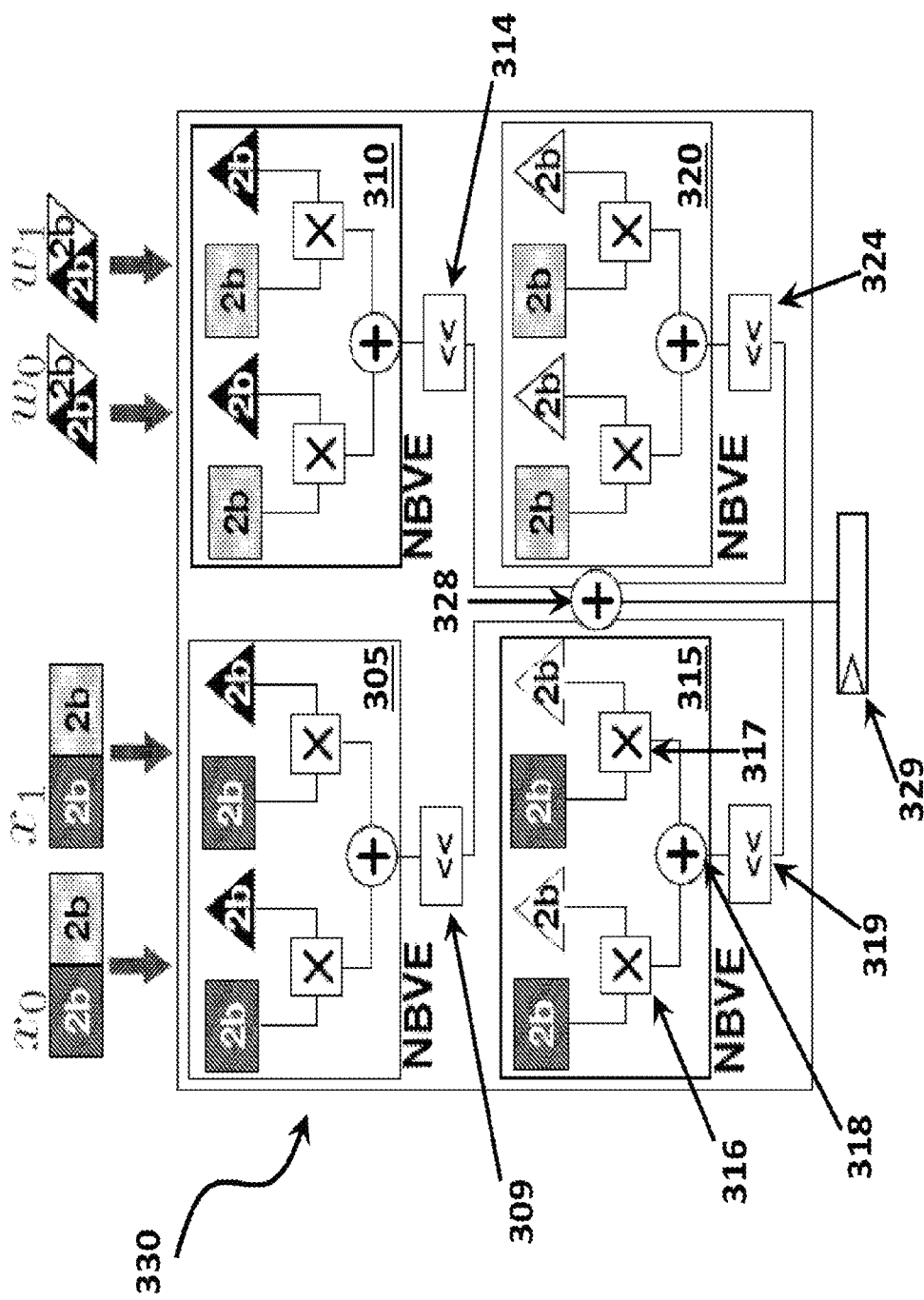
FIG. 3A shows a diagram of a Composable Vector Unit (CVU) according to an example embodiment of the disclosed technology.

FIG. 3A illustrates an instance of the hardware realization of CVU for the vector dot-product example given in FIG. 2A. In this example, CVU 330 encapsulates 4 Narrow-Bitwidth Vector Engines (NBVE) 305, 310, 315, and 320. The number of NBVEs inside a CVU is based on the size of bit-slicing and maximum bitwidth of datatypes of the elements of the two vectors on which the dot-product operation is performed (e.g., those two vectors can be a vector of inputs and a vector of weights of a layer or of an element of a neural network) that have been selected as two and four in this example, respectively. A spatial array of narrow-bitwidth multipliers, connected through an adder-tree, constitute each NBVE. For example, the NBVE 315 includes multipliers 316 and 317 as well as a summation element 318 (an adder tree including a single element, in the case shown in FIG. 3A). Each narrow-bitwidth multiplier (e.g., 316 in the example shown in FIG. 3A) performs a 2-bit by 2-bit multiplication with a 2-bit-slice of inputs and weights, the result of which then goes to the adder-tree (the summation element 318 in the example shown in FIG. 3A) to get aggregated with the outputs of other multipliers inside the NBVE (e.g., 317 in the example shown in FIG. 3A). As such, the NBVE generates a single scalar that is the result of the dot-product operation between two bit-sliced sub-vectors. The CVU 330 then shifts the outputs of NBVEs based on the significance position of their bit-sliced sub-vector operands within the original wide-bitwidth vectors of inputs and weights using shifters 309, 314, 319, and 324 and aggregates the shifted values across all the NBVEs using an aggregator element 328 to generate the final result of the vector dot-product operation. The CVU 330 can provide the result of the vector dot-product operation to an element (e.g., 329 in FIG. 3A) located outside of the CVU 330. In some example embodiments, the maximum bitwidth of inputs and weights is 8 bits and 2-bit slicing is used for the CVU. As such, CVU encapsulates 16 NBVEs that work in parallel.

Figure 3B:
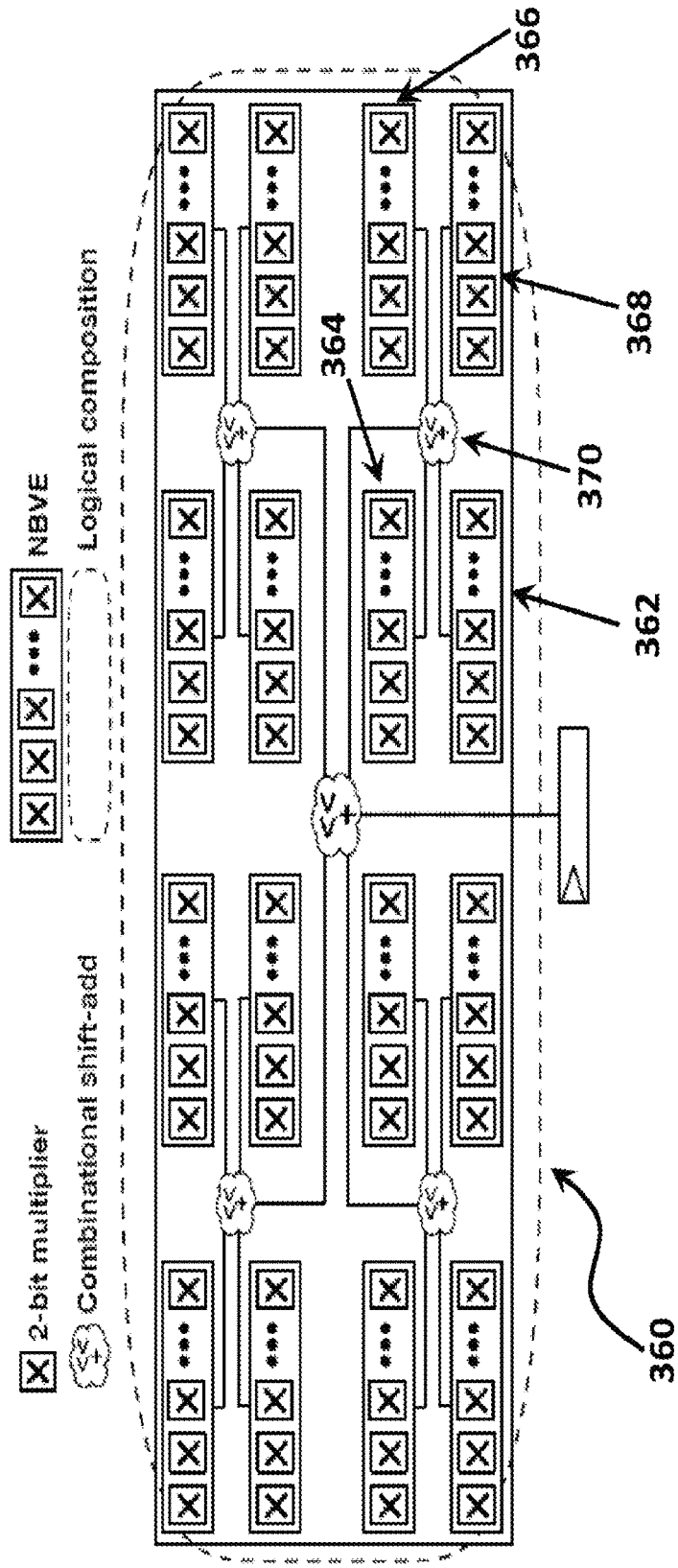
FIG. 3B illustrates cooperation of Narrow-Bitwidth Vector Engines (NBVEs) for computation of a homogeneous bitwidth dot-product according to an example embodiment of the disclosed technology.

FIG. 3B illustrates a conceptual diagram of CVU 360 according to an example embodiment when 8-bit datatypes are homogeneously exploited for DNN layers. The CVU 360 is configured such that each NBVE of the CVU 360 performs a bit-parallel dot-product on 2-bit-sliced sub-vectors of the original 8-bit by 8-bit dot-product between vectors of length L, generating a scalar. As shown in FIG. 3B, CVU 360 includes 16 NBVE engines. The NBVEs are equipped with shifters to shift their scalar outputs. As shown in FIG. 3B, a group of four NBVEs 362, 364, 366, and 368 is interconnected through a combinational add-shift element 370. Finally, to generate the final scalar of the 8-bit dot-product, all the NBVEs in the CVU globally cooperate together and CVU aggregates their outputs (by, e.g., aggregating the outputs of the combinational add-shift elements).

Figure 3C:
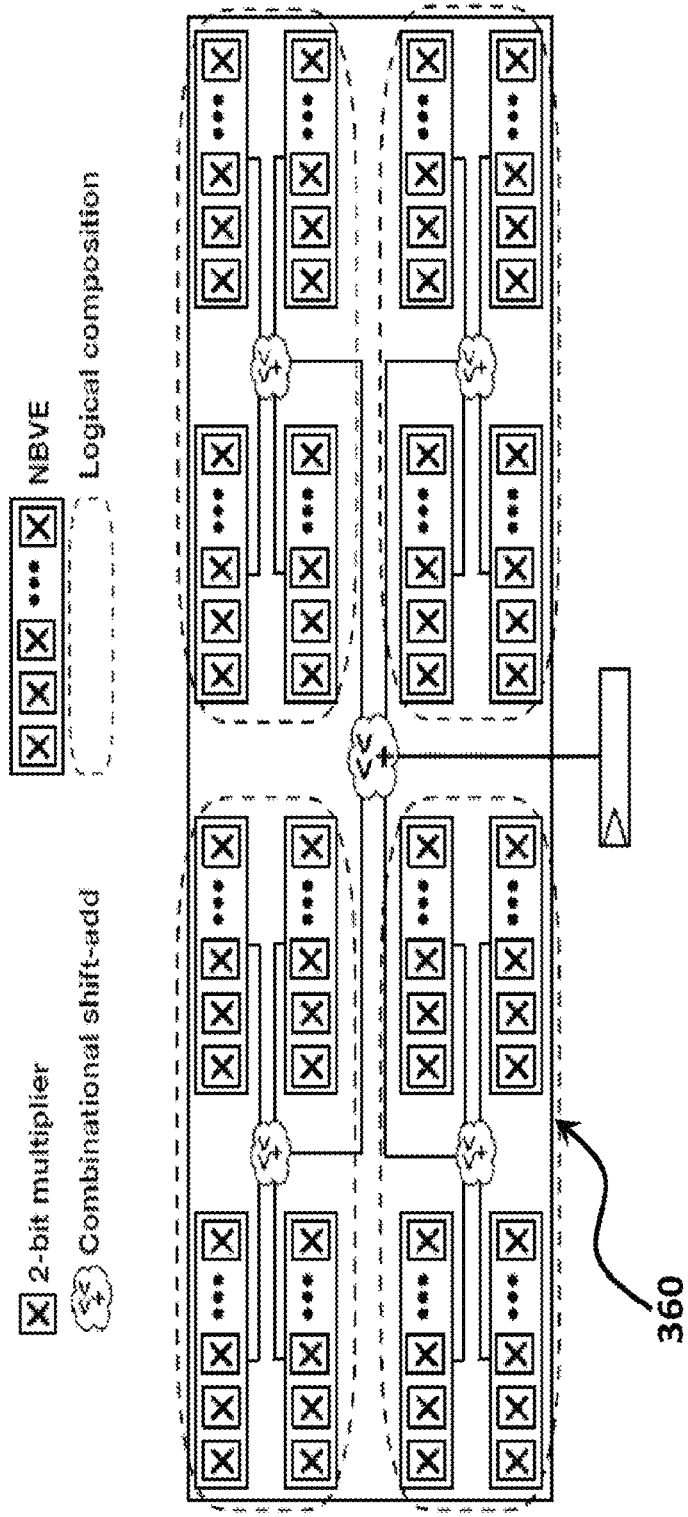
FIG. 3C illustrates cooperation of Narrow-Bitwidth Vector Engines (NBVEs) for computation of a heterogeneous quantized bitwidth dot-product according to an example embodiment of the disclosed technology.

When the DNN uses heterogeneous bitwidths (e.g., less than 8-bit datatypes) across its layers, the CVU can be dynamically reconfigured to match the bitwidths of the DNN layers at runtime. This can include both the reconfigurations of the shifters and the NBVEs composition scheme. For instance, FIG. 3C illustrates a logical composition (also referred to as configuration) of the CVU 360 according to an example embodiment when 8-bit inputs and 2-bit weights are used. In this case, the 16 NBVEs of the CVU 360 will be clustered as four groups, each of which encapsulates four NBVEs. In this mode, the CVU composes the NBVEs in two levels. At the first level, all the four NBVEs in each cluster (also referred to as a group) are privately composed together by applying the shift-add logic to complete a dot-product operation with a length of L. At the second level, the CVU globally aggregates the outputs of all four clusters and produces the scalar result of dot-product operation between vectors of length 4L. According to some example embodiments, if 2-bit datatypes are used for both inputs and weights, each NBVE performs an independent dot-product, providing 16 times higher performance compared to the homogenous 8-bit mode.

Figure 4A:
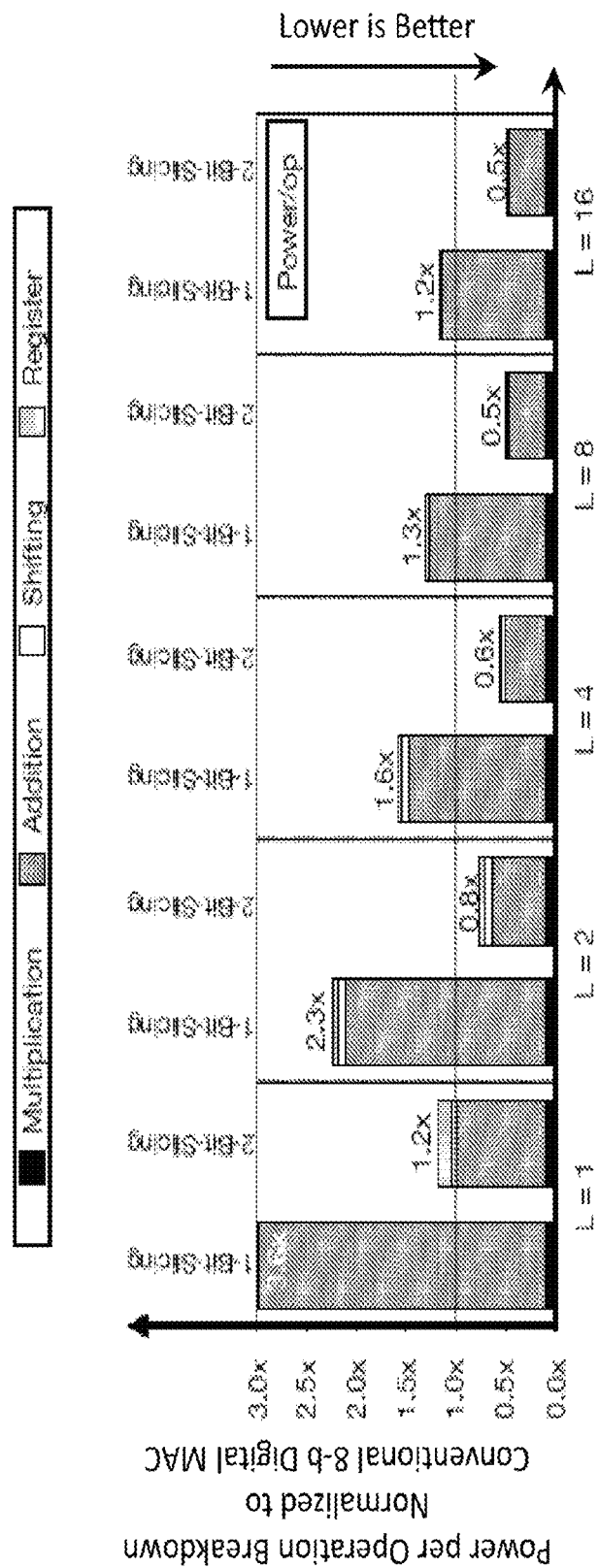
FIG. 4A illustrates power per operation cost for several example embodiments of the disclosed technology.
Figure 4B:
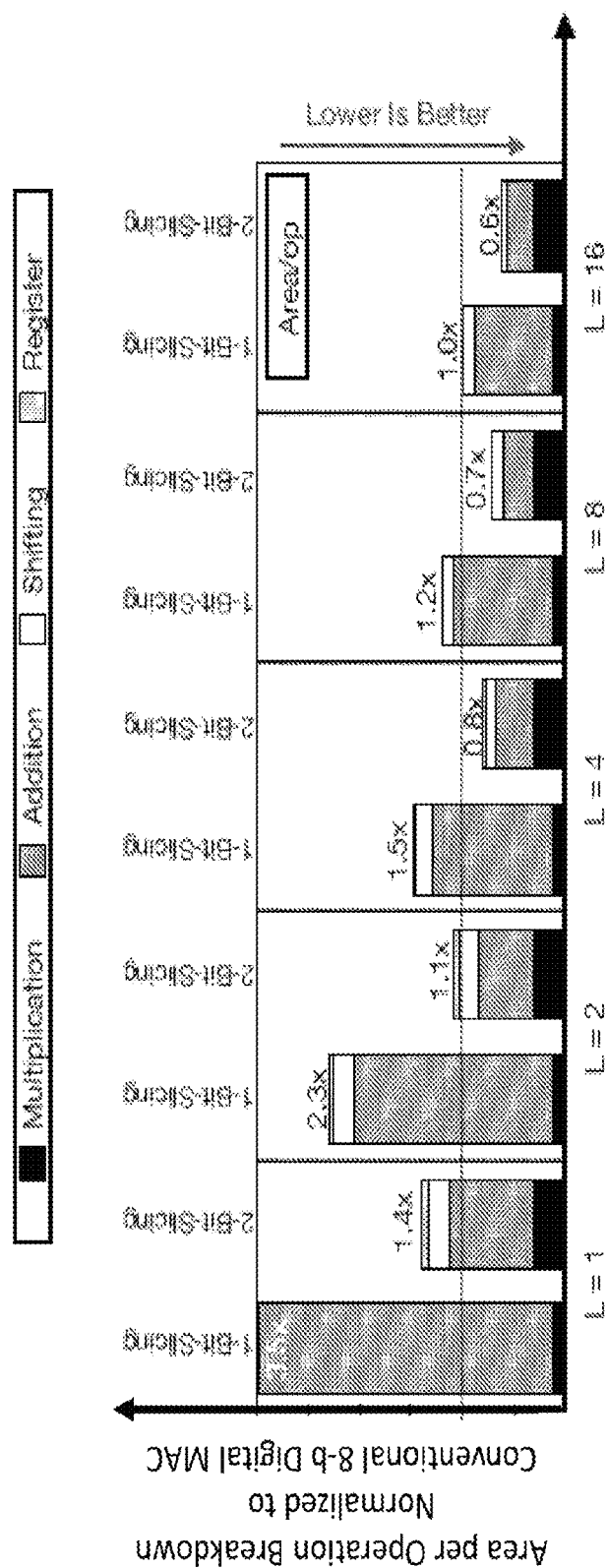
FIG. 4B illustrates area per operation cost for several example embodiments of the disclosed technology.

A design space exploration for different number of multipliers in an NBVE (L) and choice of bit-slicing as well as the sensitivity analysis of the CVU's power per operation and area per operation to these parameters was performed for a number of example embodiments. FIGS. 4A and 4B show the design space exploration for 1-bit and 2-bit slicing, in addition to different lengths L of vectors for NBVE from L=1 to L=16. All the design points in this analysis are synthesized in 500 MHz and 45 nm node. Y-Axes in FIGS. 4A and 4B show the power per one 8-bit by 8-bit MAC operation performed by CVU normalized to the power of a conventional digital 8-bit MAC unit and area per one 8-bit by 8-bit MAC operation performed by CVU normalized to the area of a conventional digital 8-bit MAC unit, respectively. We sweep the L parameter for 1-bit slicing and 2-bit slicing in the X-axis. FIGS. 4A and 4B also show the breakdown of power and area across four different hardware logics: multiplication, addition, shifting, and registering. Inspecting this analysis leads us to following four key observations:

(1) Adder-tree consumes the most power and area and might bottleneck the efficiency. As we observe in both 1-bit and 2-bit slicing, across all the hardware components adder-tree ranks first in power and area consumption. Bit-parallel vector composability according to the disclosed technology imposes two levels of add-tree logic: (a) an adder-tree private to each NBVE that sums the results of narrow-bitwidth multiplications; and (b) a global adder-tree that aggregates the outputs of NBVEs to generate the final scalar result. Hence, to gain power and area efficiency, the cost of add-tree requires to be minimized.

(2) Integrating more narrow-bitwidth multipliers within NBVEs (exploiting DLP within BLP) minimizes the cost of add-tree logic. Encapsulating a larger number of narrow-bitwidth multipliers in an NBVE leads to amortizing the cost of add-tree logic across a wider array of multipliers and yields power and area efficiency. As it is shown in FIGS. 4A and 4B, increasing L from 1 to 16 improves the power/area efficiency by approximately 3 times in 1-bit slicing and approximately 2.5 times in 2-bit slicing. However, this improvement in power/area gradually saturates. As such, increasing L beyond 16 does not provide further significant benefits.

(3) The 2-bit slicing strikes a better balance between the complexity of the narrow-bitwidth multipliers and the cost of aggregation and operand delivery in CVUs. 1-bit slicing requires 1-bit multipliers (merely AND gates), that also generates 1-bit values as the inputs of the adder-trees in NBVEs. However, slicing 8-bit operands to 1-bit requires 8×8=64 NBVEs for a CVU, imposing a costly 64-input global adder-tree to CVUs. Consequently, as it is shown in FIGS. 4A and 4B, 1-bit slicing does not provide any benefits compared to the conventional design. On the other hand, although 2-bit slicing results in generating 4-bit values by the multipliers as inputs to adder-trees in NBVEs, it quadratically decreases the total number of NBVEs in a CVU from 64 to 16 for 8-bit operands. This quadratic decrease trumps using wider-bitwidth values as the inputs of adder trees in NBVEs, significantly lowering add-tree cost. Accordingly, the design choice for a digital CVU according to some example embodiments comes with 2-bit slicing and length of L=16. Compared to a conventional digital design, this design point provides 2.0 times and 1.7 times improvement in power and area, respectively, for an 8-bit by 8-bit MAC operation. Note that 4-bit slicing provides lower power/area for CVU design, however, it leads to underutilization of compute resources when DNNs with less than 4-bits are being processed. As such, 2-bit slicing strikes a better balance between the efficiency of CVUs and their overall utilization.

(4) Bit-parallel vector composability according to the technology disclosed in this patent document amortizes the cost of flexibility across the elements of vectors. Prior bit-flexible works, both spatial (e.g., BitFusion) and temporal, enable supporting deep quantized DNNs with heterogenous bitwidths at the cost of extra area overheads. BitFusion exploits spatial bit-parallel composability for a scalar. An embodiment of the disclosed technology with 2-bit slicing and L=1 can be viewed as performing multiplication of two scalar values (a scalar value can be viewed as a vector of length L=1). As shown in FIG. 4B, this design point imposes 40% area overhead as compared to conventional design, while the design according an example implementation of the disclosed technology using 2-bit slicing and L=16 provides 40% reduction in area. Also, a CVU according to an example embodiment of the disclosed technology using L=16 and 2-bit slicing provides 2.4 times improvement in power as compared to an implementation using 2-bit slicing and L=1. This result seems counter intuitive at the first glance as flexibility often comes with an overhead. In fact, the cost of bit-level flexibility stems from aggregation logic that puts the results back together. Bit-parallel vector-level composability according to the disclosed technology amortizes this cost across the elements of the vector. Moreover, since it reduces the complexity of the cooperating narrower bitwidth units, it leads to even further reduction.

Conceptually, bit-parallel vector composability according to the disclosed technology is orthogonal to the architectural organization of the CVUs. We explore this design style using a 2D systolic array architecture, which is efficient for matrix-multiplications and convolutions. In this architecture according to the disclosed technology, called BPVEC, each CVU reads a vector of weights from its private scratchpad, while a vector of inputs is shared across columns of CVUs in each row of the 2D array. The scalar outputs of CVUs aggregate across columns of the array in a systolic fashion and accumulate using 64-bit registers.

Table I details the specification of the evaluated models. We evaluate an example implementation of the disclosed technology using these neural models in two cases of homogenous and heterogenous bitwidths. For the former one we use 8-bit datatypes for all the activations and weights and for the later we use the bitwidths reported in the results of the literature that maintain the full-precision accuracy of the models.

TABLE I

EVALUATED DNN MODELS

| DNN Models | Type | Model Size (INT8) | Multiply-Adds (GOps) | Heterogenous Bitwidths |
| --- | --- | --- | --- | --- |
| AlexNet | CNN | 56.1 MB | 2,678 | First and last layer 8-bit, the rest 4-bit |
| Inception-v1 | CNN | 8.6 MB | 1,860 | First and last layer 8-bit, the rest 4-bit |
| ResNet-18 | CNN | 11.1 MB | 4,269 | First and last layer 8-bit, the rest 4-bit |
| ResNet-50 | CNN | 24.4 MB | 8,030 | All layers with 4-bit |
| RNN | RNN | 16.0 MB | 17 | All layers with 4-bit |
| LSTM | RNN | 12.3 MB | 13 | All layers with 4-bit |

For the experiments with homogeneous fixed bitwidths, we use a Tensor Processing Unit (TPU)-like accelerator with a systolic architecture. For the case of heterogeneous bitwidths, we use BitFusion, a state-of-the-art spatial bit-flexible DNN accelerator, as the comparison point. In all setups, we use 250 mW core power budget for all the baselines and a BPVEC accelerator according to an embodiment of the disclosed technology implemented in 45 nm technology node and with 500 MHz frequency. Table II details the specifications of the evaluated platforms. We modify an open-source simulation infrastructure to obtain end-to-end performance and energy metrics for the TPU-like baseline accelerator, baseline BitFusion accelerator, as well as the BPVEC accelerator.

We also compare BPVEC to the Nvidia's RTX 2080 TI GPU, equipped with tensor cores that are specialized for deep learning inference. Table II shows the architectural parameters of this GPU. For the sake of fairness, we use 8-bit execution for the case of homogenous bitwidths and 4-bit execution for heterogenous bitwidths using the Nvidia's TensorRT 5.1 compiled with CUDA 10.1 and cuDNN 7.5.

Figure 6:
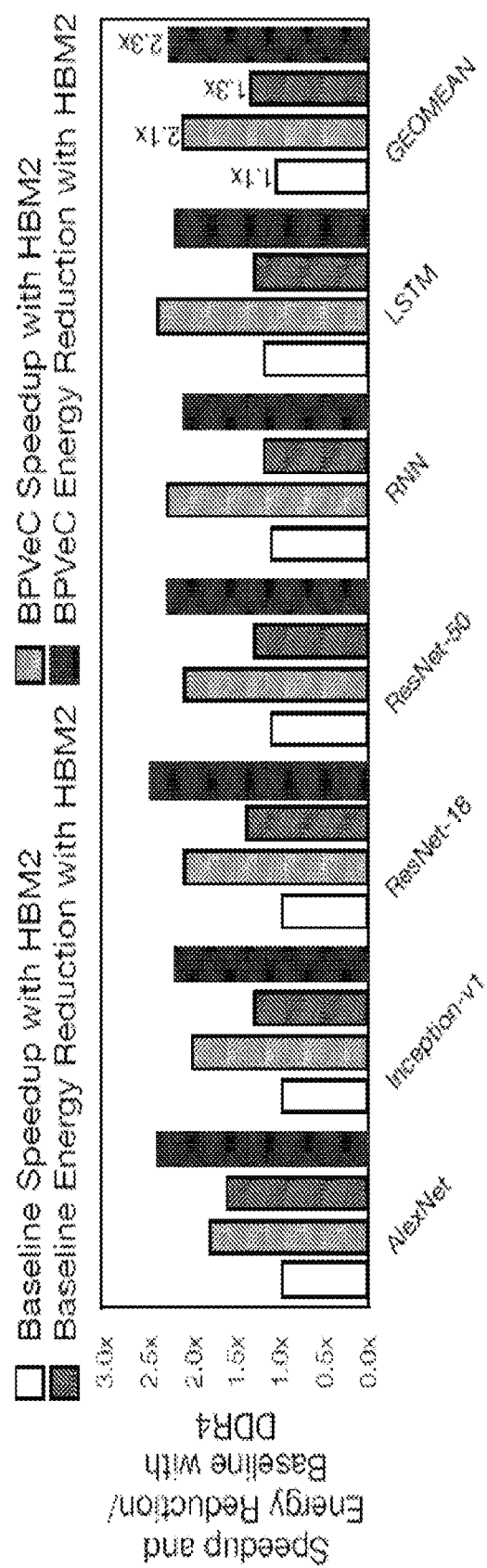
FIG. 6 illustrates benefits from a high bandwidth memory for an example implementation of the disclosed technology.

FIG. 6 shows example results of comparison of benefits from a high bandwidth memory (HBM2) for the baseline and BPVEC, normalized to the baseline with DDR4. While the baseline design sees limited benefits, BPVEC according to the disclosed technology enjoys a 2.1 times and 2.3 times speedup and energy reduction, respectively. Results suggest that BPVEC is better able to exploit the increased bandwidth and reduced energy cost from HBM2 memory system. While all benchmarks see improved efficiency, benefits are highest for bandwidth-hungry RNN and LSTM.

Figure 7:
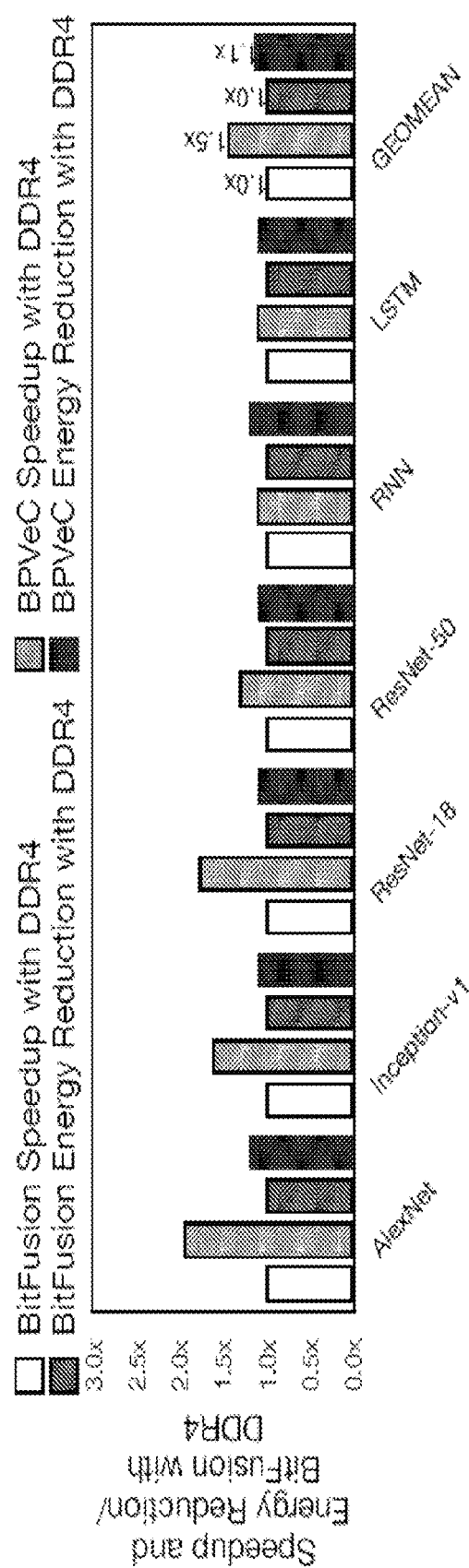
FIG. 7 shows example results of evaluation of the performance and energy benefits for quantized DNNs with heterogenous bitwidths provided by an example implementation of the disclosed technology.

FIG. 7 shows example results of evaluation of the performance and energy benefits for quantized DNNs with heterogenous bitwidths provided by an example implementation of the disclosed technology. The baseline in FIG. 7 is BitFusion, a state-of-the-art accelerator that supports flex-

TABLE II

EVALUATED HARDWARE PLATFORMS

| | ASIC Platforms | | | GPU Platform | |
| --- | --- | --- | --- | --- | --- |
| Chip | TPU-Like Baseline | BitFusion | BPVeC | Chip | RTX 2080 TI |
| # of MACs | 512 | 448 | 1024 | # of Tensor Cores | 544 |
| Architecture | Systolic | Systolic | Systolic | Architecture | Turing |
| On-chip memory | 112 KB | 112 KB | 112 KB | Memory | 11 GB (GDDR6) |
| Frequency | 500 MHz | 500 MHz | 500 MHz | Frequency | 1545 MHz |
| Technology Node | 45 nm | 45 nm | 45 nm | Technology Node | 12 nm |

We implement the BPVEC accelerator using Verilog RTL. We use Synopsis Design Compiler (L-2016.03-SP5) for synthesis and measuring energy/area. All the synthesis for the design space exploration presented in FIG. 4 are performed in 45 nm technology node and 500 MHz frequency and all the design points meet the frequency criteria. The on-chip scratchpads for ASIC designs are modeled with CACTI-P.

We evaluate an implementation of the disclosed technology with both a moderate and high bandwidth off-chip memory system to assess its sensitivity to the off-chip bandwidth. For moderate bandwidth, we use DDR4 with 16 GB/sec bandwidth and 15 pJ/bit energy for data accesses. We model the high bandwidth memory based on HBM2 with 256 GB/sec bandwidth and 1.2 pJ/bit energy for data accesses.

Figure 5:
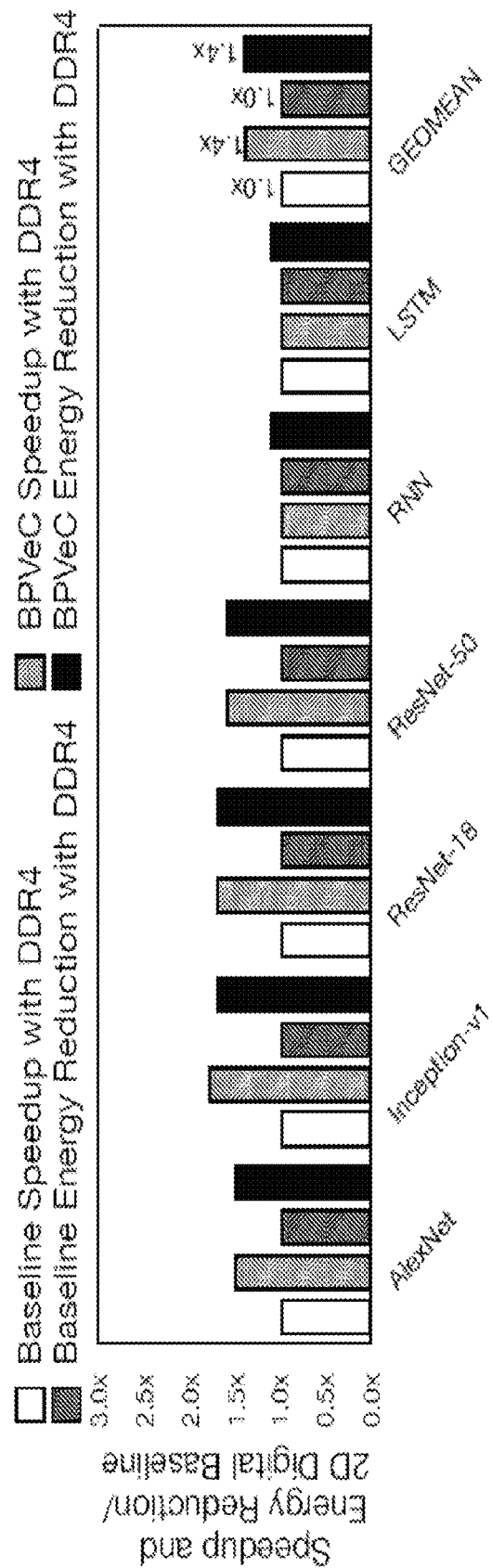
FIG. 5 shows example results of evaluation of performance and energy consumption of an example embodiment according to the disclosed technology across a range of DNNs with homogenous bitwidths.

FIG. 5 shows example results of evaluation of performance and energy consumption of an implementation of the BPVEC platform according to the disclosed technology across a range of DNNs with homogenous btiwidths (8-bit). The baseline in this case (a TPU-like ASIC platform) uses the same systolic-array architecture as the BPVEC accelerator, but with conventional MAC units. Both designs use a DRR4 memory system. Bit-parallel vector composability according to the disclosed technology enables our BPVEC accelerator to integrate approximately 2.0 times more compute resources compared to the baseline design under the same core power budget. On average, BPVEC provides 40% speedup and energy reduction. Across the evaluated workloads, CNN models enjoy more benefits compared to recursive neural network (RNN) ones. Unlike the CNNs that have significant data-reuse, the vector-matrix multiplications in RNNs have limited data-reuse and require extensive off-chip data accesses. As such, the limited bandwidth of the DDR4 memory leads to starvation of the copious on-chip compute resources in BPVEC.

ible bitwidths at the scalar level. In this experiment, the baseline BitFusion and BPVEC use DDR4 memory. Bit-parallel vector composability according to the technology disclosed in this patent document enables our design to integrate approximately 2.3 times more compute resources compared to BitFusion under the same core power budget. On average, BPVEC provides 50% speedup and 10% energy reduction over BitFusion. Across the evaluated workloads, CNN models enjoy more benefits compared to bandwidth-hungry RNN and LSTM.

Figure 8:
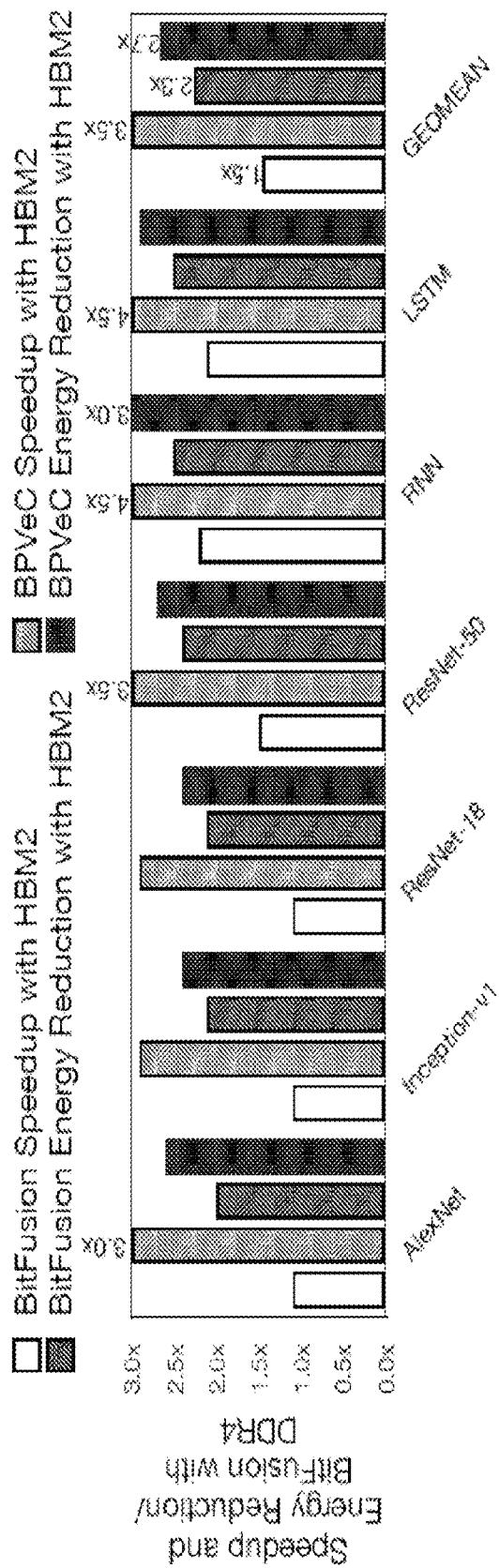
FIG. 8 illustrates benefits from a high-bandwidth off-chip memory for an example flexible-bitwidth implementation of the disclosed technology.

FIG. 8 illustrates example results of the interplay of high off-chip bandwidth with flexible-bitwidth acceleration. The speedup and energy reduction numbers are normalized to BitFusion with moderate bandwidth DDR4. BPVEC provides 2.5 times speedup and 20% energy reduction over BitFusion with HBM2 memory (3.5 times speedup and 2.7 times energy reduction over the baseline 2D BitFusion). RNN and LSTM, see the highest performance benefits (4.5 times), since these benchmarks can take advantage of both the increased compute units in BPVEC design, as well as the increased bandwidth form HBM2.

Figure 9A:
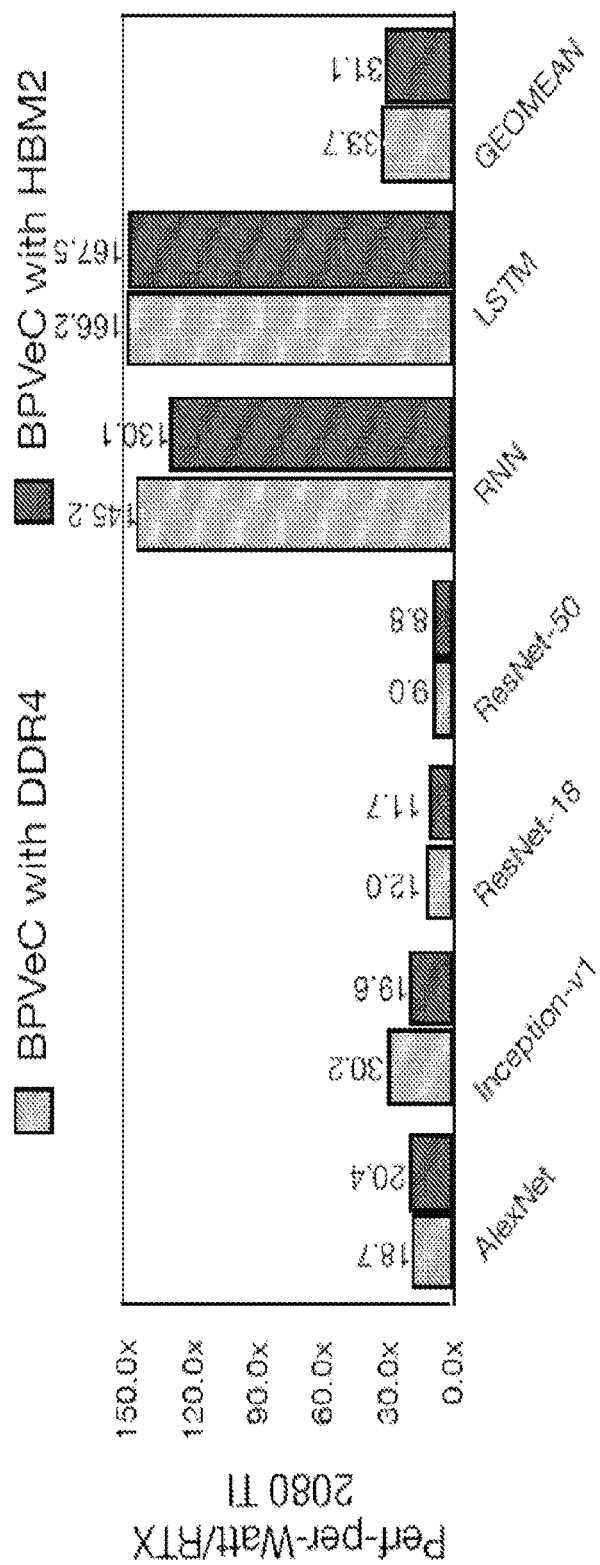
FIG. 9A shows example results of performance-per-watt comparison between an example embodiment of the disclosed technology and Nvidia RTX 2080 TI GPU for the case of homogenous bitwidths of DNN layers.
Figure 9B:
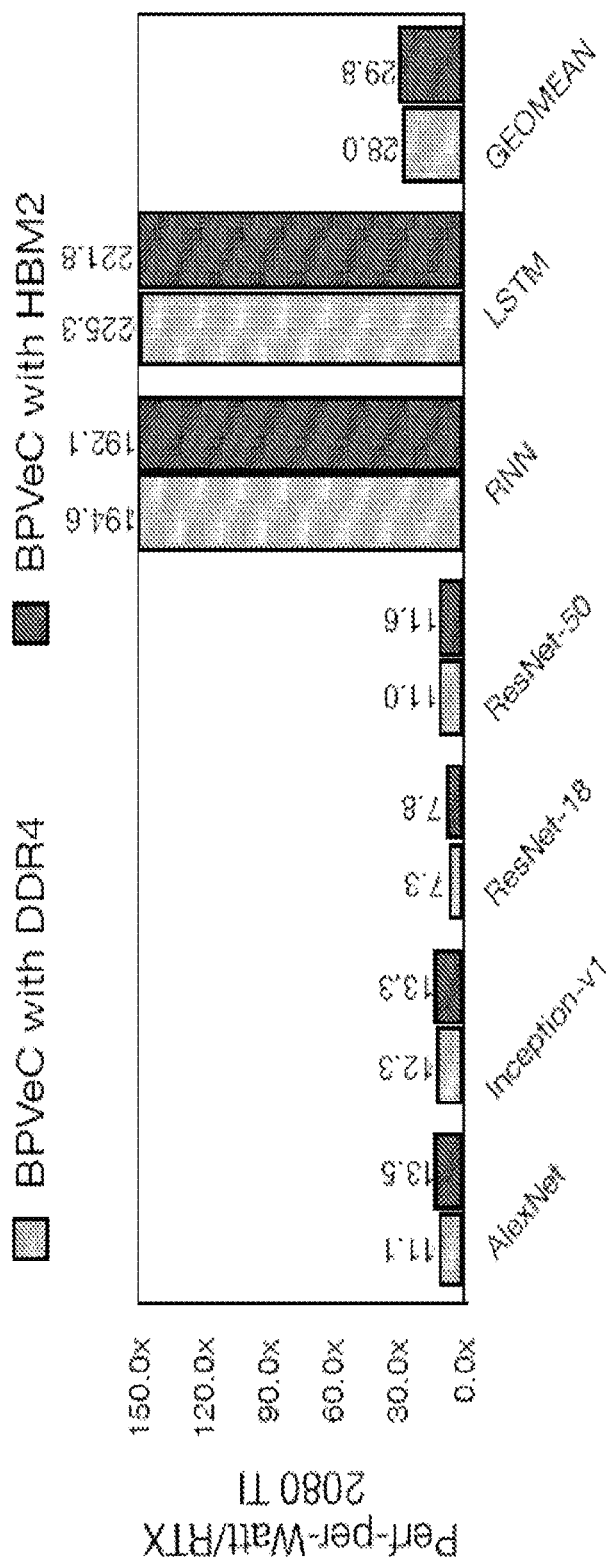
FIG. 9B shows example results of performance-per-watt comparison between an example embodiment of the disclosed technology and Nvidia RTX 2080 TI GPU for the case of heterogenous bitwidths of DNN layers.

FIGS. 9A and 9B show example results of comparison of the Performance-per-Watt of BPVEC design according to the disclosed technology with DDR4 and HBM2 memory and with homogenous (FIG. 9A) and heterogenous (FIG. 9B) bitwidths for DNN layers, respectively as compared to the Nvidia's RTX 2080 TI GPU. With homogenous bitwidths (FIG. 9A), BPVEC achieves 33.7 times and 31.1 times improvements on average with DDR4 and HBM2 memory, respectively. Across the evaluated workloads, the RNN models see the most benefits. These models require a large amount of vector-matrix multiplications, which particularly suitable for the proposed bit-parallel vector composability design style. In the case of heterogenous bitwidths, the benefits go to 28.0 times and 29.8 times with DDR4 and HBM2, respectively. The trends look similar to the homogenous 8-bit mode, since both the design points and the GPU baseline exploit the deep quantized mode of operations.

A large body of work has explored hardware acceleration for DNNs by exploiting their algorithmic properties such as data-level parallelism, tolerance for reduced precision and sparsification, and redundancy in computations. To realize the hardware accelerators, prior efforts have built upon isolated compute units that operate on all the bits of individual operands and have used multiple compute units operating together to extract data-level parallelism. The technology disclosed in this patent document implements a different design style that uses the interleaving of bit-level operations across compute units in the context of vectors and combines the benefits from bit-level parallelism and data-level parallelism, both of which are abundant in DNNs.

Figure 10:
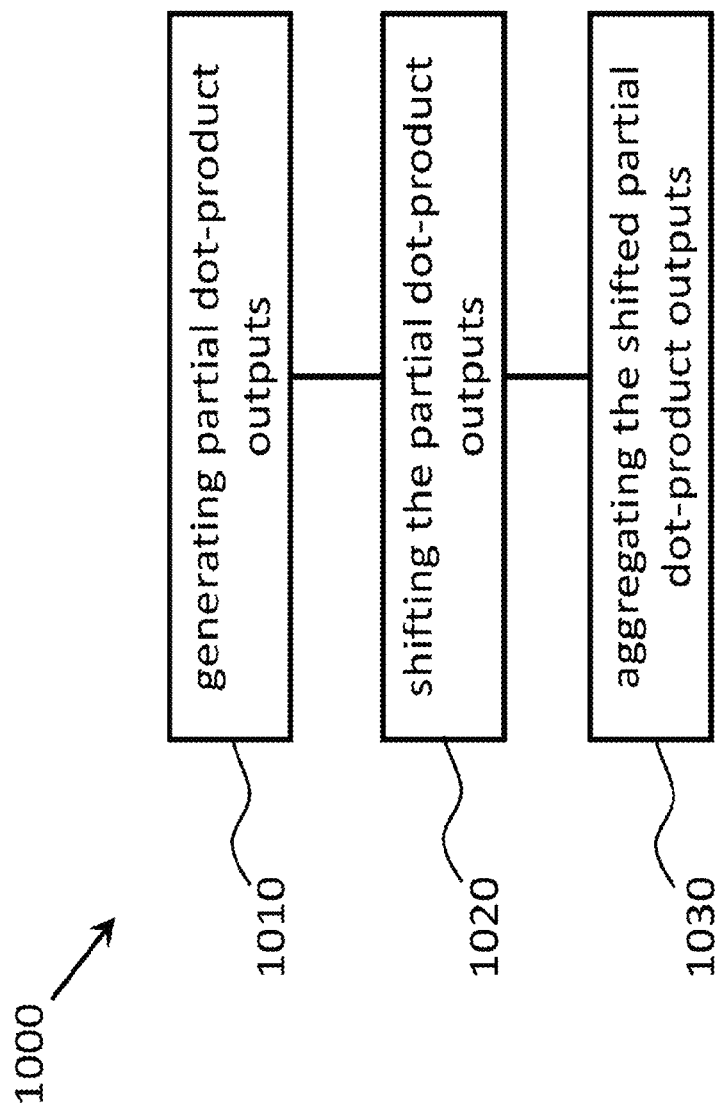
FIG. 10 shows a flow diagram of an example embodiment of a method according to the technology disclosed in this patent document.

FIG. 10 illustrates steps of a method 1000 of performing an energy-efficient dot-product operation between two vectors according to an embodiment of the technology disclosed in this patent document. Step 1010 of the method 1000 includes generating partial dot-product outputs, wherein each partial dot-product output is based on performing a dot-product operation on a subset of bits of the two vectors using an array of multipliers (a multiplier is, generally, an electric circuit that can take two or more numbers and output a product of those numbers) connected through one or more add units (an add unit (also referred to as an add element) is, generally, an electric circuit that can take two or more numbers and output their total value; in some implementations, the add unit is an adder). Step 1020 of the method 1000 includes shifting the partial dot-product outputs using bit shifters (a shifter is, generally, a circuit with one or more inputs and one or more outputs wherein the outputs are shifted with respect to the inputs). Step 1030 of the method 1000 includes aggregating the shifted partial dot-product outputs using an aggregator (in some implementations, the aggregator is an add unit; in some embodiments, the aggregator is configured to add numbers represented by a first number of bits and generate an output represented by a second number of bits) to produce a scalar output for the energy-efficient dot-product operation. In the method 1000, the generating partial dot-product outputs is performed in a parallel manner.

Figure 11:
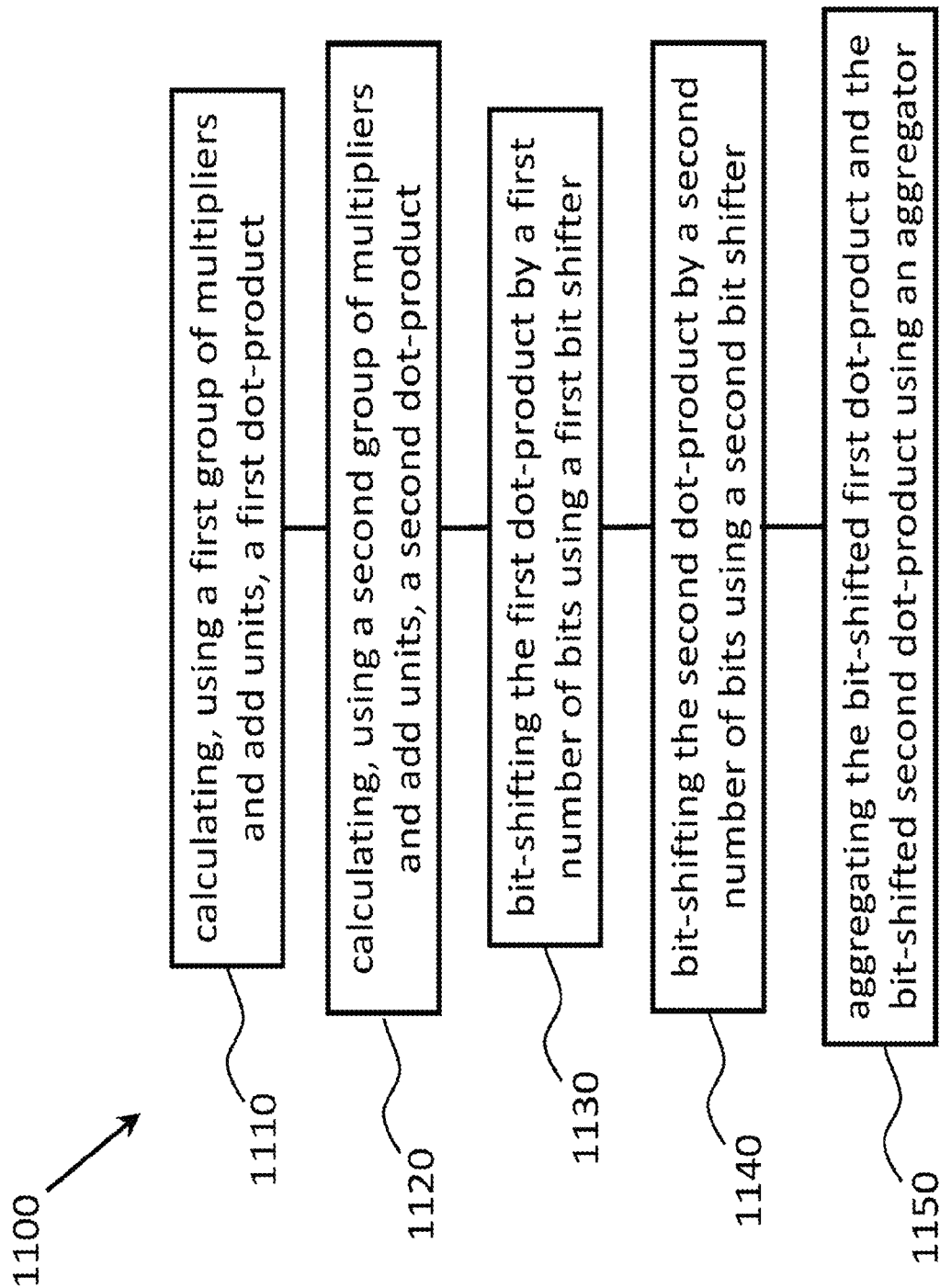
FIG. 11 shows a flow diagram of an example embodiment of another method according to the technology disclosed in this patent document.

FIG. 11 illustrates steps of a method 1100 of performing an energy-efficient dot-multiplication of a first vector and a second vector according to an embodiment of the technology disclosed in this patent document. Step 1110 of the method 1100 includes calculating, using a first group of multipliers and add units, a first dot-product between a third vector and a fourth vector, wherein each element of the third vector includes a subset of bits of a corresponding element of the first vector and each element of the fourth vector includes a subset of bits of a corresponding element of the second vector. Step 1120 of the method 1100 includes calculating, using a second group of multipliers and add units, a second dot-product between a fifth vector and a sixth vector, wherein each element of the fifth vector includes a subset of bits of a corresponding element of the first vector and each element of the sixth vector includes a subset of bits of a corresponding element of the second vector. Step 1130 of the method 1100 includes bit-shifting the first dot-product by a first number of bits using a first bit shifter. Step 1140 of the method 1100 includes bit-shifting the second dot-product by a second number of bits using a second bit shifter. Step 1150 of the method 1100 includes aggregating the bit-shifted first dot-product and the bit-shifted second dot-product using an aggregator. In the method 1100, at least one of the calculating the first dot-product or bit-shifting the first dot-product is performed in parallel with at least one of the calculating the second dot-product or bit-shifting the second dot-product.

Figure 12:
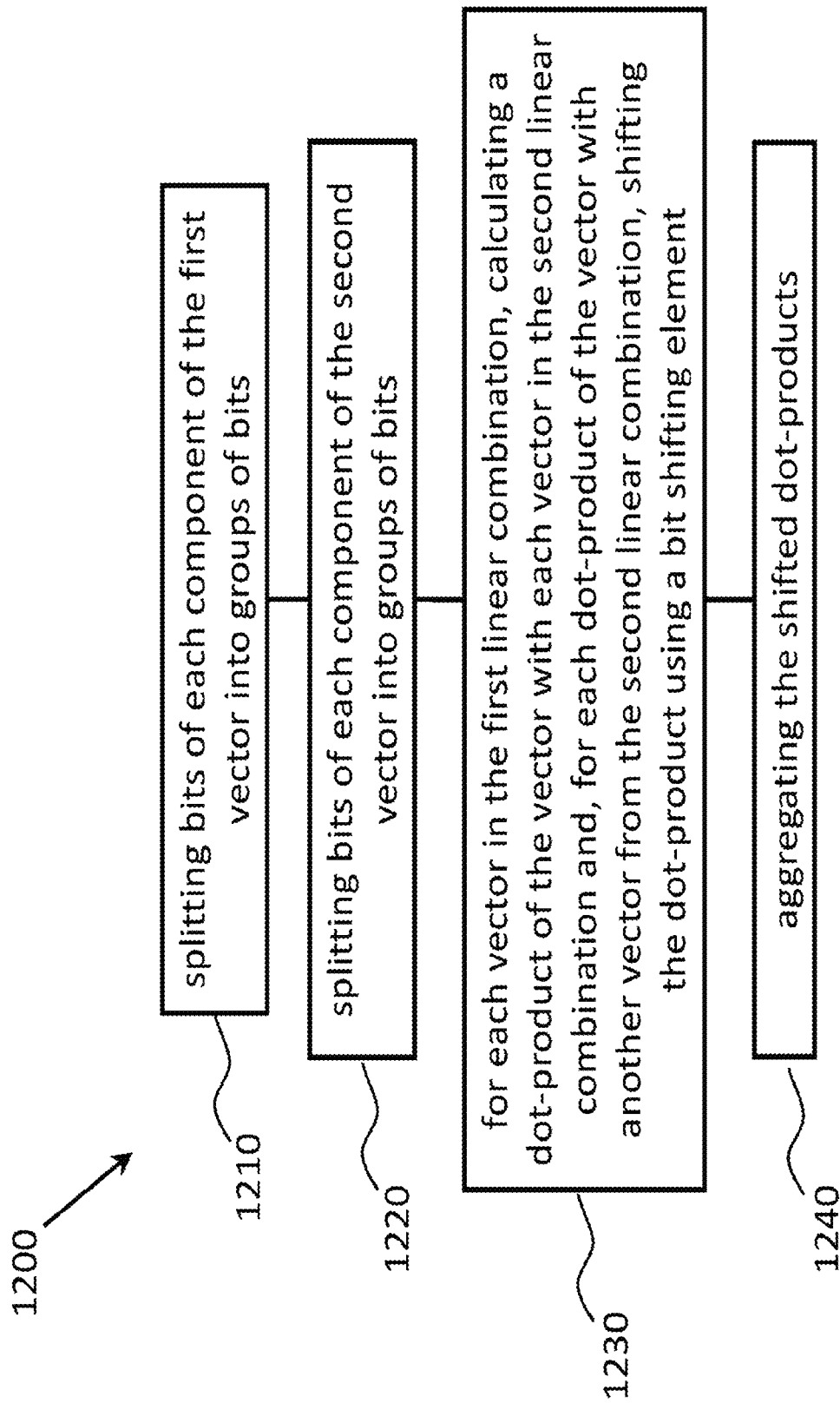
FIG. 12 shows a flow diagram of an example embodiment of yet another method according to the technology disclosed in this patent document.

FIG. 12 illustrates steps of a method 1200 of performing an energy-efficient dot-multiplication operation on a first vector and a second vector, wherein each vector component of the first vector has a first number of bits and each vector component of the second vector has a second number of bits. Step 1210 of the method 1200 includes splitting bits of each component of the first vector into groups of bits such that the first vector is equal to a first linear combination of one or more vectors, wherein each component of each vector in the first linear combination includes a group of bits of a corresponding component of the first vector and has a third number of bits which is equal to or less than the first number of bits. Step 1220 of the method 1200 includes splitting bits of each component of the second vector into groups of bits such that the second vector is equal to a second linear combination of one or more vectors, wherein each component of each vector in the second linear combination includes a group of bits of a corresponding component of the second vector and has a fourth number of bits which is equal to or less than the second number of bits. Step 1230 of the method 1200 includes for each vector in the first linear combination, calculating, using multipliers connected through add elements, a dot-product of the vector with each vector in the second linear combination and, for each dot-product of the vector with another vector from the second linear combination, shifting the dot-product using a bit shifting element. Step 1240 of the method 1200 includes aggregating the shifted dot-products to obtain a result of the dot-multiplication operation on the first vector and the second vector. In the method 1200, at least some of the splitting, dot-product or shifting operations are performed at the same time.

One aspect of the disclosed technology relates to an apparatus for performing an energy-efficient dot-product operation between two input vectors, comprising: a plurality of vector computation engines, wherein each vector computation engine from the plurality of vector computation engines comprises: an array of multipliers connected through one or more add units and configured to generate an output of the vector computation engine based on a dot-product operation on a subset of bits of the two input vectors; a plurality of shifters configured to shift the outputs of the vector computation engines; and an aggregator coupled to the plurality of shifters and configured to generate a scalar output for the energy-efficient dot-product operation based on aggregating the shifted outputs.

In some example embodiments of the apparatus for performing an energy-efficient dot-product operation between two input vectors, the plurality of vector computation engines is configured to operate in parallel. According to some example embodiments, one of the two vectors is a vector of weights of a neural network. In some example embodiments, one of the two vectors is a vector of inputs of a layer (or of an element) of a neural network. In certain example embodiments, the number of the vector computation engines is based on a size of the subset of bits of the two input vectors and bitwidths of datatypes of elements of the two input vectors. In some example embodiments, the number of the vector computation engines is based on a size of the subset of bits of the two input vectors and a maximum bitwidth of datatypes of elements of the two input vectors. According to some example embodiments, each multiplier in the array of multipliers is configured to perform a 2-bit by 2-bit multiplication. In certain example embodiments, the number of multipliers in the array of multipliers is 16. In some example embodiments, each multiplier in the array of multipliers is configured to perform a 4-bit by 4-bit multiplication. In certain example embodiments, the plurality of vector computation engines is configurable into multiple groups of vector computation engines according to bitwidths of elements of the two input vectors. According to some example embodiments, the plurality of shifters is configurable (e.g., dynamically or during runtime) according to bitwidths of elements of the two input vectors. In some example embodiments, the multipliers of the array of multipliers and add units are configurable according to bitwidths of elements of the two input vectors. In some example embodiments the apparatus for performing an energy-efficient dot-product operation between two input vectors comprises a memory configured to store the vector of weights.

Another aspect of the disclosed technology relates to an apparatus for performing an energy-efficient dot-product operation between a first vector and a second vector, comprising: a first group of multipliers and add units, wherein the first group of multipliers and add units is configured to produce a first dot-product of a third vector and a fourth vector, wherein each element of the third vector includes a subset of bits of a corresponding element of the first vector and each element of the fourth vector includes a subset of bits of a corresponding element of the second vector; a second group of multipliers and add units, wherein the second group of multipliers and add units is configured to produce a second dot-product of a fifth vector and a sixth vector, wherein each element of the fifth vector includes a subset of bits of a corresponding element of the first vector and each element of the sixth vector includes a subset of bits of a corresponding element of the second vector; a first bit shifter configured to bit-shift the first dot-product by a first number of bits; a second bit shifter configured to bit-shift the second dot-product by a second number of bits; and an aggregator configured to aggregate the bit-shifted first dot-product and the bit-shifted second dot-product, wherein the apparatus is configured to generate at least one of the first dot-product or the bit-shifted first dot-product in parallel with at least one of the second dot-product or the bit-shifted second dot-product.

An aspect of the disclosed technology relates to a method of performing an energy-efficient dot-product operation between two vectors, comprising: generating partial dot-product outputs, wherein each partial dot-product output is based on performing a dot-product operation on a subset of bits of the two vectors using an array of multipliers connected through one or more add units; shifting the partial dot-product outputs using bit shifters; and aggregating the shifted partial dot-product outputs using an aggregator to produce a scalar output for the energy-efficient dot-product operation, wherein the generating partial dot-product outputs is performed in a parallel manner.

In some example embodiments of the method of performing an energy-efficient dot-product operation between two vectors, one of the two vectors is a vector of weights of a neural network. In certain example embodiments, one of the two vectors is a vector of inputs of a layer (or of an element) of a neural network. According to some example embodiments, the number of the partial dot-product outputs is based on a size of the subset of bits of the two vectors and bitwidths of datatypes of components of the two vectors. In certain example embodiments, the number of the partial dot-product outputs is based on a size of the subset of bits of the two vectors and a maximum bitwidth of datatypes of components of the two vectors. In some example embodiments, each multiplier is configured to perform a 2-bit by 2-bit multiplication. According to some example embodiments, the number of multipliers in the array of multipliers is 16. In certain example embodiments, each multiplier is configured to perform a 4-bit by 4-bit multiplication. According to some example embodiments, the method of performing an energy-efficient dot-product operation between two vectors further comprises configuring (e.g., dynamically or during runtime) the shifter elements based on bitwidths of components of the two vectors. In some example embodiments, the method of performing an energy-efficient dot-product operation between two vectors further comprises configuring the multiplies and add units based on bitwidths of components of the two vectors.

Another aspect of the disclosed technology relates to a method of performing an energy-efficient dot-multiplication of a first vector and a second vector, comprising: calculating, using a first group of multipliers and add units, a first dot-product between a third vector and a fourth vector, wherein each element of the third vector includes a subset of bits of a corresponding element of the first vector and each element of the fourth vector includes a subset of bits of a corresponding element of the second vector; calculating, using a second group of multipliers and add units, a second dot-product between a fifth vector and a sixth vector, wherein each element of the fifth vector includes a subset of bits of a corresponding element of the first vector and each element of the sixth vector includes a subset of bits of a corresponding element of the second vector; bit-shifting the first dot-product by a first number of bits using a first bit shifter; bit-shifting the second dot-product by a second number of bits using a second bit shifter; and aggregating the bit-shifted first dot-product and the bit-shifted second dot-product using an aggregator, wherein at least one of the calculating the first dot-product or bit-shifting the first dot-product is performed in parallel with at least one of the calculating the second dot-product or bit-shifting the second dot-product.

Yet another aspect of the disclosed technology relates to a method of performing an energy-efficient dot-multiplication operation on a first vector and a second vector, wherein each vector component of the first vector has a first number of bits and each vector component of the second vector has a second number of bits, comprising: splitting bits of each component of the first vector into groups of bits such that the first vector is equal to a first linear combination of one or more vectors, wherein each component of each vector in the first linear combination includes a group of bits of a corresponding component of the first vector and has a third number of bits which is equal to or less than the first number of bits; splitting bits of each component of the second vector into groups of bits such that the second vector is equal to a second linear combination of one or more vectors, wherein each component of each vector in the second linear combination includes a group of bits of a corresponding component of the second vector and has a fourth number of bits which is equal to or less than the second number of bits; for each vector in the first linear combination, calculating, using multipliers connected through add elements, a dot-product of the vector with each vector in the second linear combination and, for each dot-product of the vector with another vector from the second linear combination, shifting the dot-product using a bit shifting element; and aggregating the shifted dot-products to obtain a result of the dot-multiplication operation on the first vector and the second vector, wherein at least some of the splitting, dot-product or shifting operations are performed at the same time.

In some example embodiments of the method of performing an energy-efficient dot-multiplication operation on a first vector and a second vector, each numeric coefficient in the first linear combination is equal to a power of two. According to some example embodiments, each numeric coefficient in the second linear combination is equal to a power of two. In some example embodiments, the dot-product is shifted by a number of bits determined based on a numeric coefficient of the vector in the first linear combination and a numeric coefficient of the another vector in the second linear combination. In certain example embodiments, the dot-product is shifted by a number of bits equal to a sum of a value of an exponent of two of a numeric coefficient of the vector in the first linear combination and a value of an exponent of two of a numeric coefficient of the another vector in the second linear combination.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. An apparatus for performing an energy-efficient dot-product operation between two input vectors, comprising:
   a plurality of vector computation engines configurable into multiple groups of vector computation engines, wherein each vector computation engine from the plurality of vector computation engines comprises:
   an array of multipliers connected through one or more add units and configured to
   generate an output of the vector computation engine based on a dot-product
   operation on a subset of bits of the two input vectors;
   a plurality of shifters configured to shift the outputs of the vector computation engines based on a significance position, within the two input vectors, of a sub-vector associated with the outputs; and an aggregator coupled to the plurality of shifters and configured to generate a scalar output for the energy-efficient dot-product operation based on aggregating the shifted outputs, wherein a number of the vector computation engines is based, in part, on bitwidths of datatypes of elements of the two input vectors, wherein the multiple groups are operable according to levels including at least one level in which outputs generated by each of the multiple groups are aggregated to produce a final scalar result for the energy-efficient dot-product operation.

2. The apparatus of claim 1, wherein the plurality of vector computation engines is configured to operate in parallel.

3. The apparatus of claim 1, wherein one of the two vectors is a vector of weights of a neural network.

4. The apparatus of claim 1, wherein the number of the vector computation engines is further based on a size of the subset of bits of the two input vectors.

5. The apparatus of claim 1, wherein the number of the vector computation engines is based on a size of the subset of bits of the two input vectors and a maximum bitwidth of datatypes of elements of the two input vectors.

6. The apparatus of claim 1, wherein each multiplier in the array of multipliers is configured to perform a 2-bit by 2-bit multiplication.

7. The apparatus of claim 6, wherein the number of multipliers in the array of multipliers is 16.

8. The apparatus of claim 1, wherein each multiplier in the array of multipliers is configured to perform a 4-bit by 4-bit multiplication.

9. The apparatus of claim 1, wherein the plurality of vector computation engines is configurable into multiple groups of vector computation engines according to bitwidths of elements of the two input vectors.

10. The apparatus of claim 1, wherein the plurality of shifters is configurable according to bitwidths of elements of the two input vectors.

11. The apparatus of claim 1, wherein the multipliers of the array of multipliers and add units are configurable according to bitwidths of elements of the two input vectors.

12. The apparatus of claim 3, comprising a memory configured to store the vector of weights of the neural network.

13. An apparatus for performing an energy-efficient dot-product operation between a first vector and a second vector, comprising:
   a plurality of vector computation engines configurable into multiple groups of vector computation engines, the plurality of vector computation engines including,
      a first vector computation engine comprising a first group of multipliers and add units, wherein the first vector computation engine, with the first group of multipliers and add units, is configured to produce a first dot-product of a third vector and a fourth vector, wherein each element of the third vector includes a subset of bits of a corresponding element of the first vector and each element of the fourth vector includes a subset of bits of a corresponding element of the second vector, and
      a second vector computation engine comprising a second group of multipliers and add units, wherein the second vector computation engine, with the second group of multipliers and add units, is configured to produce a second dot-product of a fifth vector and a sixth vector, wherein each element of the fifth vector includes a subset of bits of a corresponding element of the first vector and each element of the sixth vector includes a subset of bits of a corresponding element of the second vector;
   a first bit shifter configured to bit-shift the first dot-product by a first number of bits;
   a second bit shifter configured to bit-shift the second dot-product by a second number of bits; and
   an aggregator configured to aggregate the bit-shifted first dot-product and the bit-shifted second dot-product,
   wherein the apparatus is configured to generate at least one of the first dot-product or the bit-shifted first dot-product in parallel with at least one of the second dot-product or the bit-shifted second dot-product,
   wherein one of the first vector or the second vector is a vector of inputs of a layer of a neural network, wherein results of the first vector computation engine and the second vector computation engine are combined according to a bitwidth of the layer of the neural network,
   wherein the multiple groups are operable according to levels including at least one level in which outputs generated by each of the multiple groups are aggregated to produce a final scalar result for the energy-efficient dot-product operation.

14. A method of performing an energy-efficient dot-product operation between two vectors, comprising:
   generating partial dot-product outputs of a plurality of vector computation engines configurable into multiple groups of vector computation engines, wherein each partial dot-product output is based on performing a dot-product operation on a subset of bits of the two vectors using an array of multipliers connected through one or more add units;
   shifting the partial dot-product outputs of the vector computation engines belonging to the multiple groups using bit shifters; and
   aggregating the shifted partial dot-product outputs of each of the multiple groups using an aggregator to produce a scalar output for the energy-efficient dot-product operation,
   wherein the generating partial dot-product outputs is performed in a parallel manner, wherein a number of the vector computation engines is based, in part, on bitwidths of datatypes of elements of the two vectors,
   wherein the multiple groups are operable according to levels including at least one level in which outputs generated by each of the multiple groups are aggregated to produce a final scalar result for the energy-efficient dot-product operation.

15. The method of claim 14, wherein one of the two vectors is a vector of weights of a neural network.

16. The method of claim 14, wherein the number of the partial dot-product outputs is based on at least one of:
   a size of the subset of bits of the two vectors and bitwidths of datatypes of components of the two vectors, or
   a size of the subset of bits of the two vectors and a maximum bitwidth of datatypes of components of the two vectors.

17. The method of claim 14, wherein each multiplier is configured to perform a 2-bit by 2-bit multiplication.

18. The method of claim 14, wherein each multiplier is configured to perform a 4-bit by 4-bit multiplication.

19. The method of claim 14, comprising configuring the shifter elements based on bitwidths of components of the two vectors.

20. The method of claim 14, comprising configuring the multiplies and add units based on bitwidths of components of the two vectors.

* * * * *